(12) United States Patent
Engelking et al.

(10) Patent No.: US 10,150,688 B2
(45) Date of Patent: Dec. 11, 2018

(54) CLOSING MECHANISM FOR THE MOLD HALVES OF AN I.S. MACHINE

(71) Applicant: HEYE INTERNATIONAL GMBH, Obernkirchen (DE)

(72) Inventors: Stefan Engelking, Hespe (DE); Dirk Winkelhake, Nienstädt (DE); Benedikt Felgenhauer, Herford (DE)

(73) Assignee: HEYE INTERNATIONAL GMBH, Obernkirchen (DE)

( * ) Notice: Subject to any disclaimer, the term of this patent is extended or adjusted under 35 U.S.C. 154(b) by 158 days.

(21) Appl. No.: 15/319,551

(22) PCT Filed: May 23, 2015

(86) PCT No.: PCT/EP2015/001062
§ 371 (c)(1),
(2) Date: Dec. 16, 2016

(87) PCT Pub. No.: WO2015/192940
PCT Pub. Date: Dec. 23, 2015

(65) Prior Publication Data
US 2017/0121208 A1     May 4, 2017

(30) Foreign Application Priority Data

Jun. 16, 2014   (DE) ........................ 10 2014 008 534

(51) Int. Cl.
*C03B 9/353*       (2006.01)
*C03B 9/38*        (2006.01)
*C03B 40/027*      (2006.01)

(52) U.S. Cl.
CPC .......... *C03B 9/3537* (2013.01); *C03B 9/3816* (2013.01); *C03B 9/3866* (2013.01);
(Continued)

(58) Field of Classification Search
CPC .... C03B 9/3537; C03B 9/3816; C03B 9/3866
See application file for complete search history.

(56) References Cited

U.S. PATENT DOCUMENTS

| 4,070,174 A | 1/1978 | Nebelung et al. |
| 4,449,996 A | 5/1984 | Irwin et al. |

(Continued)

FOREIGN PATENT DOCUMENTS

| DE | 2623106 A1 | 1/1977 |
| DE | 3346466 A1 | 6/1984 |

(Continued)

OTHER PUBLICATIONS

International Search Report from PCT/EP2015/001062 dated Dec. 8, 2015.

*Primary Examiner* — James Sanders
(74) *Attorney, Agent, or Firm* — Fox Rothschild LLP

(57) ABSTRACT

A closing mechanism for the mold halves of an I.S. machine, including two yoke-like mold holders mounted on parallel guides and movable between a closed position and an open position by means of a drive. A spindle transmission is provided laterally to at least one guide, the spindle transmission including a threaded spindle that is connected to the drive via a transmission and is in engagement with two threaded sleeves, each of which is connected to one of the two mold holders via two threaded sections running in opposite directions. By means of the drive, a servomotor, the opening and closing movement of the mold holders is carried out. Two pneumatically actuated piston-cylinder units are provided in order to apply the clamping force required between the mold holders or the mold halves in the closed position.

31 Claims, 23 Drawing Sheets

(52) U.S. Cl.
    CPC .......... *C03B 9/3875* (2013.01); *C03B 9/3883* (2013.01); *C03B 9/3891* (2013.01); *C03B 40/027* (2013.01)

(56) References Cited

U.S. PATENT DOCUMENTS

| | | |
|---|---|---|
| 4,652,291 A | 3/1987 | Hirt |
| 2005/0005647 A1 | 1/2005 | Shue et al. |

FOREIGN PATENT DOCUMENTS

| | | |
|---|---|---|
| EP | 2230217 A1 | 9/2010 |
| WO | 2010102590 A2 | 9/2010 |

CLOSING MECHANISM FOR THE MOLD HALVES OF AN I.S. MACHINE

BACKGROUND

The invention pertains to a closing mechanism for the mold halves of an individual section (I.S.) machine.

Such a closing mechanism for use on the blank molds of an I.S. machine is known, for example, from DE 33 466 C2. In this case, two mold holders designed for respectively carrying three mold halves are provided, wherein one end of a crank arm, the other end of which is connected to a drive shaft, is respectively supported on the upper ends of said mold holders, and wherein oppositely directed rotational motions of the two drive shafts are realized by means of the vertically extending piston rod of a pneumatically actuated piston-cylinder unit arranged in a lateral housing and an intermediate arrangement of transmission levers. The activation of the piston-cylinder unit makes it possible to move the mold halves between an open and a closed position of the closing mechanism, namely along an arcuate transfer curve that slightly raises the mold halves, wherein connecting rods are provided along the transfer curve in order to preserve the parallel alignment of the oppositely arranged mold halves relative to one another, and wherein said connecting rods respectively form a parallel linkage for guiding each of the two mold holders together with the aforementioned crank arms. The transfer curve is designed in such a way that two respectively adjoining mold halves are starting from the closed position abruptly separated from an upwardly extending neck shape when an opening motion is initiated, wherein this measure is intended to reduce the wear. Some of the components designed for converting the linear motion of the aforementioned piston rod into symmetric, oppositely directed rotational motions of the two drive shafts protrude from the underside of the housing. A duct system equipped with a valve makes it possible to act upon the regions behind the mold halves and within the mold holders with cooling air.

DE 26 23 106 B2 discloses another closing mechanism, in which the transfer curve of the mold halves is in contrast to the object of DE 33 46 466 C2 realized linearly. For this purpose, mold carrier halves are respectively arranged such that they can be displaced between a closed and an open position by means of compressed air motors along parallel guide rods rigidly arranged on the machine. A gear mechanism with a comparatively complex design characterized by an articulately connected lever is located between the compressed air motors and the mold carrier halves. The closing mechanism proposed in this publication is equally suitable for use in blank molds and finishing molds of a glass forming machine.

These known closing mechanisms are characterized by a complex mechanical design of the connection between the mold holders and the drive used. Due to the plurality of transmission elements, it is particularly difficult to realize a largely backlash-free connection. In addition, the installation of an effective cooling system for preventing thermally related stresses, particularly between mold holder and machine base body, is not sufficiently taken into account.

EP 2 230 217 A1 discloses a closing mechanism for the blank mold halves of an IS glass forming machine, in which two blank mold holders are linearly guided toward one another and apart from one another in a parallel fashion on a common guide shaft such that both blank mold holders can be simultaneously transferred into an open or a closed position. The guide shaft extends on one side of the two blank mold holders. The disadvantage of this concept can be seen in that it is impossible to realize a symmetric force transfer to the multiple blank molds that are held by the blank mold holders during the glass forming process.

US 2005/0005647 A1 discloses an inverting mechanism for transferring parisons from the blank mold side of a glass forming machine to a finish mold side, wherein said inverting mechanism is combined with a closing mechanism for opening and closing the neck ring arms designed for taking hold of the parisons. For this purpose, a spindle shaft with two oppositely oriented thread sections carrying respective spindle nuts is provided, wherein said thread sections are respectively connected to a neck ring arm designed for holding a parison. The threaded spindle can be driven in an oscillating fashion between an open and a closed position of the neck ring arms and therefore linearly in the axial direction of the spindle shaft by means of a first servomotor. A ball spline shaft extends coaxial to and surrounds the threaded spindle and is respectively connected to the neck ring arms by means of a ball key nut, wherein the ball spline shaft can be driven by means of a second servomotor independently of the first servomotor in order to realize a pivoting motion of the neck ring arms between a position facing the blank mold side and a position facing the finishing mold side about the axis of the spindle shaft. This publication does not contain any information on the design of a closing mechanism of the blank molds that is active during a glass forming process.

U.S. Pat. No. 4,652,291 A discloses another closing mechanism for opening and closing the neck ring arms of an inverting mechanism, wherein this closing mechanism has a design comparable to that of the object of the latter-mentioned publication and is structurally combined with said inverting mechanism.

WO 2010/102590 A2 discloses another comparable closing mechanism for the blank molds or finishing molds of a glass forming machine, in which the mold holder halves are supported on linear guides such that they can be displaced between an open and a closed position. The guide is formed by a first rod of circular cross section that extends on one side of the mold holder halves at a height that approximately corresponds to half the height of the mold holder halves, wherein a second rod of rectangular cross section, which is accommodated in a U-shaped profile and extends along the bottom region of the mold holder halves parallel to the first rod, is arranged opposite of this first rod on the opposite side of the mold holder halves. An independent drive is assigned to each of the mold holder halves and connected to the respective mold holder half by means of a cam and a sliding block guided in a groove.

This known closing mechanism is characterized by a respective punctiform transmission of the closing force to the mold holder halves, namely at a distance from the guide. In addition to an uneven distribution of the closing force over the mold holder halves, a tilting motion of the mold holder halves on the guides cannot be ruled out in this case.

SUMMARY

The invention is based on the objective of improving a closing mechanism of the initially described type such that the mold holders can be guided between a closed and an open position free of thermal stresses and particularly the mechanical concept of said closing mechanism is simplified. Furthermore, the drive system also appears to be in need of improvement with respect to an optimized zero backlash in order to thereby guide the mold holders in the most accurate, uniform and low-wearing fashion possible.

In one aspect of the disclosure, a yoke-like design of the two mold holders that are supported on two spaced-apart linear guides extending parallel to one another and can be displaced between an open position, in which the mold halves carried thereby are spaced apart from one another, and a closed position, in which the mold halves adjoin one another and thereby form a peripherally closed mold, by means of a drive. The mold halves can be fixed on the respective mold holders by means of a quick-action clamping system, wherein one, two or even more mold halves are arranged on each mold holder and uniformly clamped together in the closed position. This basic concept is characterized by a simple mechanical design, the realization of which requires fewer components than the prior art.

The linear motion of the two mold holders is realized with a spindle gear, the threaded spindle of which is connected to the drive and features two oppositely oriented thread sections that in turn are engaged with threaded sleeves connected to the mold holders. In this way, a symmetric opening and closing motion referred to a vertical center plane can be realized.

The mold holder is equipped with a network of ducts designed for conveying a coolant, wherein the coolant used consists of cooling air.

At least one network designed for conveying a coolant is provided for cooling parts of the machine base body, particularly housing parts thereof. The amount of coolant flowing through this network is preferably also adjustable.

Additional features of the invention concern a first variation of a drive system, on which the closing mechanism is based. This drive system consists of an electric servomotor, by means of which the opening and closing motions are carried out, and at least one pneumatically actuated piston-cylinder unit, by means of which the mold holders are clamped together in the closed position. The axis of the servomotor arranged on one side of the mold holders preferably extends parallel to the guides and the piston-cylinder unit is respectively held or supported on the machine base body.

In an additional feature of the invention, a toggle lever mechanism, by means of which the required clamping force can be generated in the closed position of the closing mechanism, is respectively arranged between the or each piston-cylinder unit and the mold holders.

Other features of the invention concern a second variation of a drive system, on which the closing mechanism is based. This drive system consists of two electric servomotors that are arranged to both sides of the mold holders and designed for realizing the opening and closing motions, as well as for generating a clamping force in the closed position.

Thermal stresses can be prevented, in particular, in the above-described first variation. In the second variation, the second drive can be slidably arranged in linear guides such that no stresses between the mold holders and the machine base body occur.

In an additional aspect of the invention, guides are provided between the machine base body and the mold halves and allow an operationally related thermal expansion of the respective mold half such that stresses in this respect are prevented. The positioning of these guides, namely the constructive design of a stationary part and a part that is movable relative thereto, should be realized such that at least an unobstructed thermal expansion of the mold holders in their longitudinal direction can progressively take place from a central region toward the outside.

In accordance with another aspect of the invention, the torque transmission from the servomotor/the servomotors to the respective spindle gear takes place by means of a gear mechanism in the form of a cylindrical gear unit, at least one of the gear wheels of which consists of two gear disks that are rotatable relative to one another in order to realize a backlash-free drive. The relative rotational position can be fixed such that a backlash between the gear wheels, as well as relative to a spindle provided in the drivetrain, can be compensated based on this relative rotatability.

This gear disk concept is equally suitable for use in both variations.

According to other aspects of the invention, the aforementioned duct network may also be designed for cooling a mold half and/or a neck shape. In one such embodiment, the amounts of coolant that are respectively fed to the neck shape or the mold half may be individually adjustable. In another embodiment, at least sections of such a duct network may be designed for permanent cooling. This makes it possible to permanently cool the respective component during an ongoing process. In addition, quarter segments of the mold halves may be designed such that the coolant can be conveyed in an individually adjustable fashion. This allows a flexible and individually adaptable adjustment.

According another embodiment, the coolant used within the duct network may be conveyed in a closed circuit that contains at least one cooler or heat exchanger and a pump.

In other aspects of the invention, several individually adjustable circuits for the coolant may be provided. In this way, an arbitrarily adjustable cooling effect can be realized in accordance with the spatial distribution of the two circuits.

According to another embodiment, this applies analogously to a lubricant supply system that is realized in the form of a recirculating lubrication system, wherein the lubricant used may, if applicable, be supplied to the respective lubricating points several times after it was subjected to respective cooling and filtering processes. This provides particular advantages in comparison with loss lubrication, namely also with respect to environmental protection.

In another aspect of the invention, the lubricant is discharged from the upper side of the guides designed for supporting the mold holders and forms a lubricating film thereon such that a smooth displacement of the mold holders is achieved.

Additional aspects concern another embodiment of the lubricant supply system. It is essential to provide a lubricant bath in a housing that is designed for accommodating a gear mechanism, a spindle gear and, if necessary, a toggle lever mechanism. The housing is designed for accommodating the lubricant discharged from the openings on the upper side of the respective guide and provided with an overflow such that the lubricant bath within the housing has a defined level. The housing therefore forms part of the circuit designed for realizing the recirculating lubrication system. The guides for supporting the mold holders are respectively located in the immediate vicinity of such a housing.

According to another aspect, the aforementioned housing is closed with a cover segment such that the machine components arranged within the housing, as well as the lubricant, are protected from environmental influences, particularly dirt accumulations. This protection is also promoted by acting upon the interior of the housing with sealing air.

In accordance with another embodiment, the connection between a servomotor and a gear mechanism is realized in the form of a clamping connection that can be actuated without requiring a tool. The removal and the installation of a servomotor can thereby be realized in a comparatively simple fashion.

Additional embodiments concern the mounting of the mold halves on the respective mold holders. These characteristics are intended to simplify the measures associated with the accurately positioned installation and the removal of a mold half. It is essential to arrange construction elements, which are compatible with one another and allow a centered and secured mounting of each mold half in its installation position, on the mold halves and on the mold holders. These elements consist, for example, of a sliding block that is connected to the mold half and a tensioner that is guided in the mold holder and ends in a hook, wherein said tensioner is designed for mounting and tensioning a mold half relative to the mold holder. The actuation of the tensioner can be advantageously realized by means of a spring-loaded cam such that the tensioner can in any case be displaced between a removal position, in which the mold half can be mounted, and an installation position that brings about the clamped state.

BRIEF DESCRIPTION OF THE DRAWINGS

The invention is described in greater detail below with reference to exemplary embodiments that are schematically illustrated in the drawings. In these drawings.

DETAILED DESCRIPTION

Figure 1:
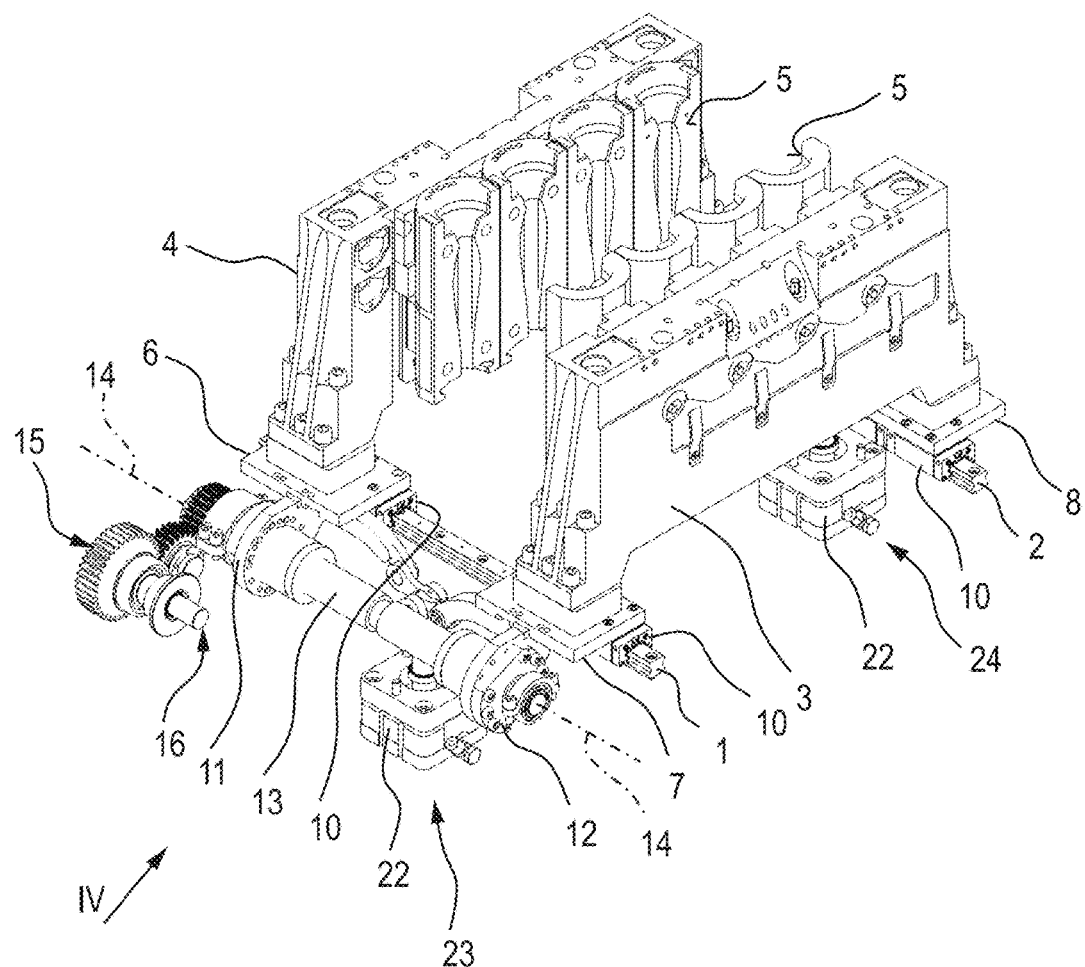
FIG. 1 shows a perspective representation of a first variation of the closing mechanism in an open position.
Figure 2:
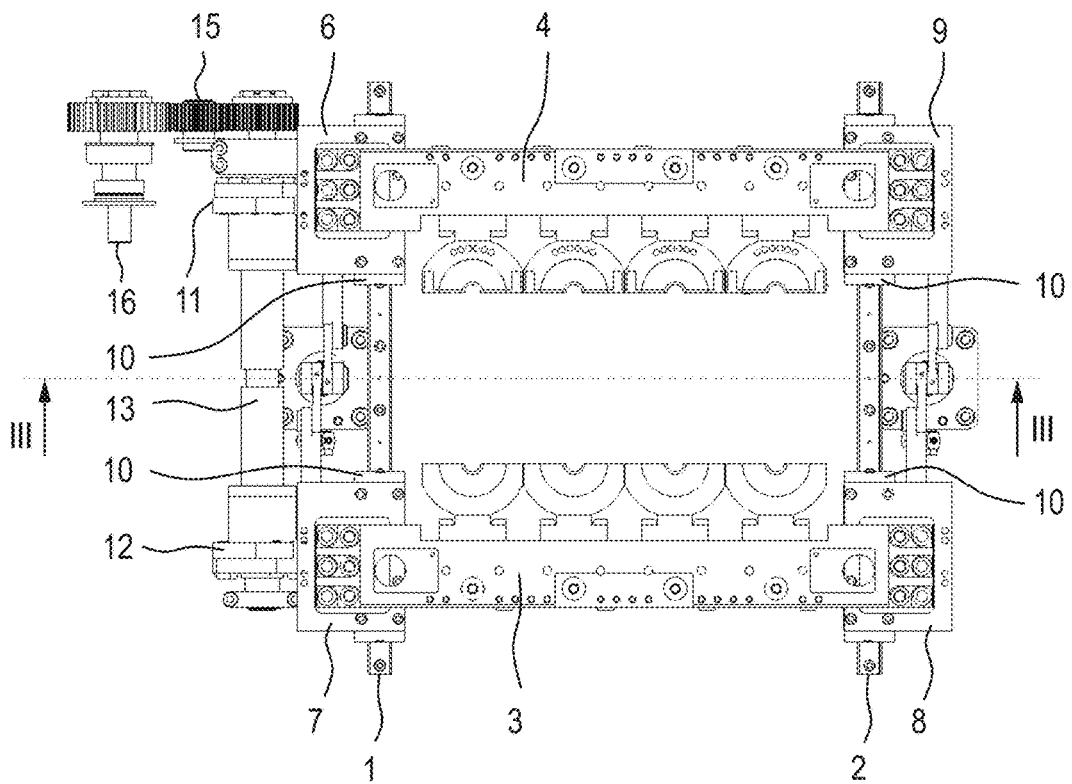
FIG. 2 shows a top view of the closing mechanism according to FIG. 1 in the form of a planar representation.
Figure 3:
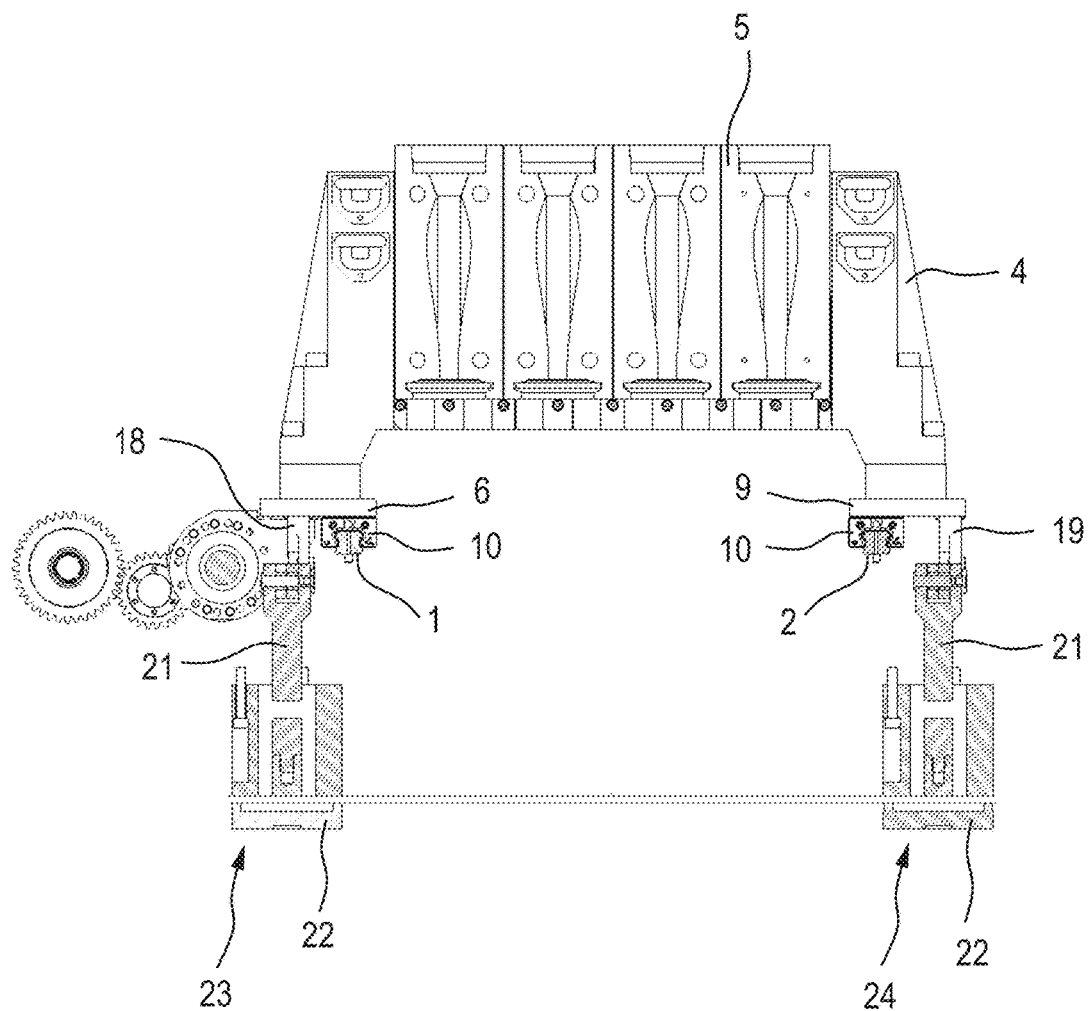
FIG. 3 shows a representation of the closing mechanism according to FIG. 2 in a vertical plane of section.
Figure 4:
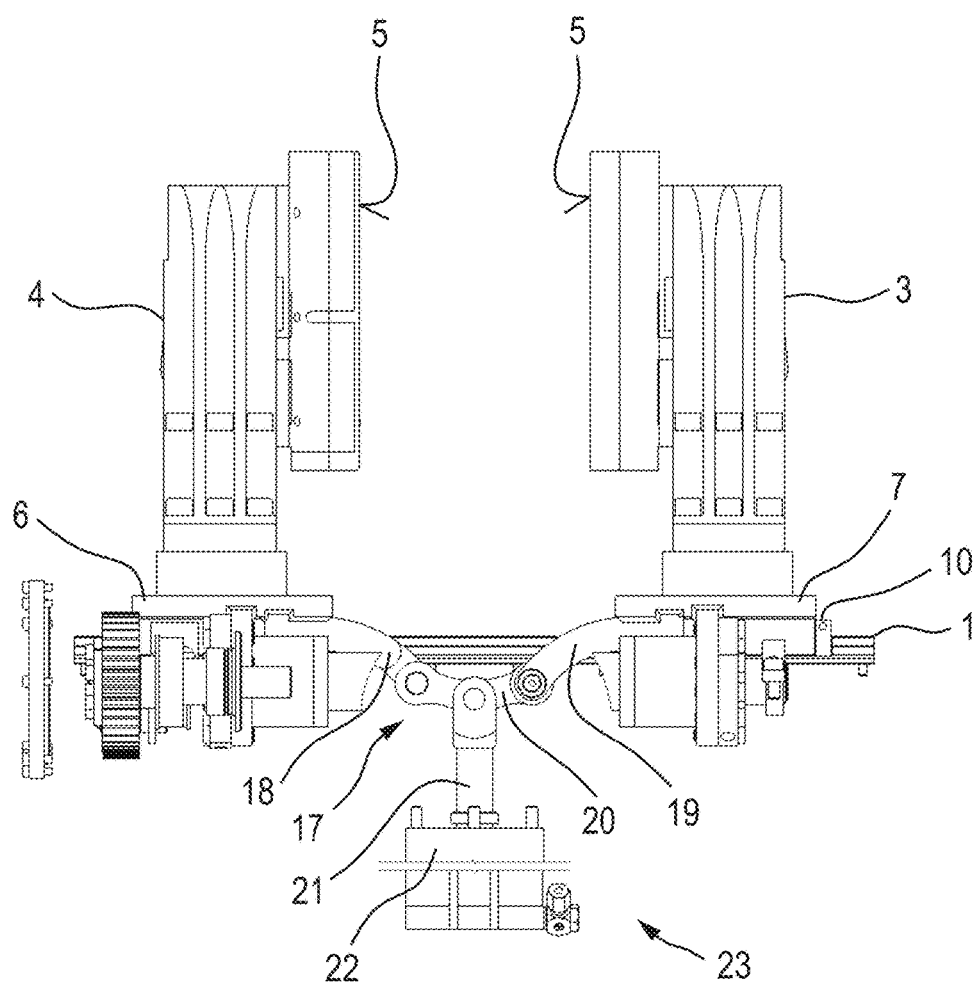
FIG. 4 shows a partially planar representation of the closing mechanism in the viewing direction IV in FIG. 1.
Figure 5:
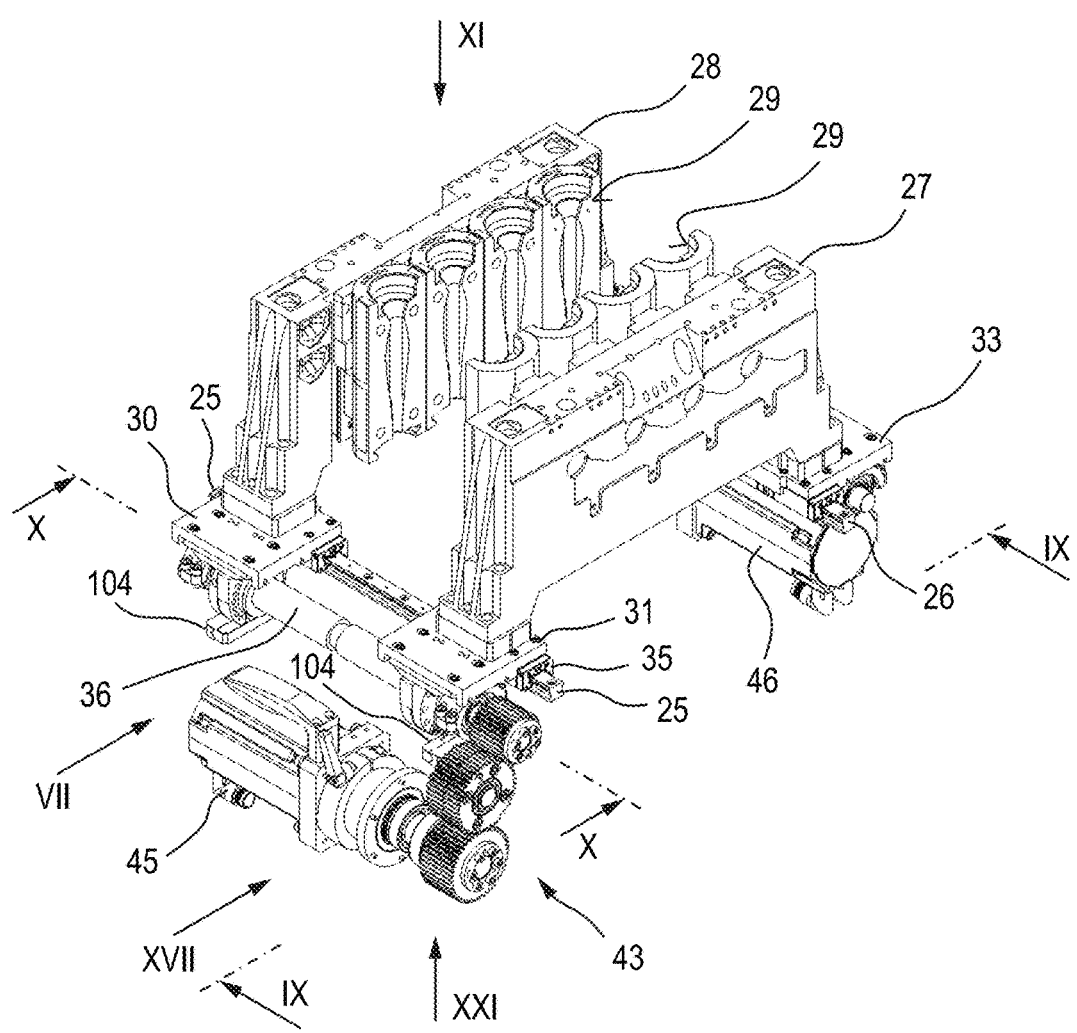
FIG. 5 shows a perspective representation of a second variation of the closing mechanism in an open position.

The basic design of a first variation of an inventive closing mechanism is described below with reference to FIGS. 1-4.

These figures show two mold holders 3, 4 that are supported on spaced-apart guides 1, 2 extending parallel to one another and respectively designed for carrying four mold halves 5. The support is realized on base plates 6, 7, 8 and 9 that are slidably arranged on the guides 1, 2 by means of sliding carriages 10.

The reference symbols 11, 12 respectively identify mounting plates that are fastened on the base plates 6, 7 and extend away from the base plates in parallel planes. A spindle gear 13 with an axis 14 extending parallel to the guides 1, 2 is mounted on these mounting plates and designed for generating a linear motion of the base plates 6, 7 and consequently of the mold holders 3, 4 between an open position illustrated in the drawings and a closed position parallel to the axis 14. The spindle gear 13 may practically consists of two spindle drives with oppositely oriented threads.

The driving motion of the spindle gear 13 in the opening direction and in the closing direction of the mold halves 5 is generated by an electric servomotor that is not illustrated in the drawings and motively connected to the spindle gear 13 via a gear mechanism 15, wherein the axis of said servomotor extends parallel to the axis 14 of the spindle gear 13. Analogous to the two guides 1, 2, the servomotor and the gear mechanism 15 are arranged on a common machine frame of a glass forming machine that is likewise not illustrated in the drawings. The aforementioned servomotor is connected to the gear mechanism 15 at the location 16.

Two base plates 6-9 lying opposite of one another perpendicular to the guides 1, 2 are respectively connected by means of a toggle lever mechanism 17, wherein respective toggle levers 18, 19 are directly coupled to the base plates in a pivotable fashion and the ends of the toggle levers 18, 19 facing away from the base plates are coupled to the opposing ends of a connecting lever 20 that forms a toggle link, and wherein said connecting lever is centrally acted upon by the piston rod 21 of the piston-cylinder unit 22 in a direction extending perpendicular to a connecting line between the coupling points of the identically constructed toggle levers 18, 19.

The pneumatically actuatable piston-cylinder unit 22 mounted on the machine base body and the toggle lever mechanism 17 jointly form a drive unit 23 that is assigned to the guide 1 and designed for clamping together the mold holders 3, 4 and consequently the mold halves 5 in the closed position, wherein another identically constructed drive unit 24 is assigned to the guide 2.

The piston-cylinder units 23, 24 are always positioned centrally between the mold holders 3, 4 such that the symmetric design of the toggle lever mechanisms 17 of the two drive units 23, 24 referred to a vertical center axis makes it possible to generate correspondingly symmetric clamping forces.

In this first exemplary embodiment, the closing motion of the mold holders 3, 4 is realized with the drive assigned to the spindle gear 13, but the mold holders are clamped together pneumatically in cooperation with the two toggle lever mechanisms 17.

The basic design of a second variation of an inventive closing mechanism is described below with reference to FIGS. 5-10.

These figures show two spaced-apart guides 25, 26 that extend parallel to one another and on which two mold holders 27, 28 are slidably supported between an open position illustrated in the drawings and a closed position. The mold holders 27, 28 are designed in the form of carriers of mold halves 29 as described in greater detail below. The support of the mold holders 27, 28 is realized with an intermediate arrangement of base plates 31, 32 and 33, 34 that are assigned to each of the mold holders 27, 28 in pairs and slidably supported on the guides 25, 26 by means of intermediately arranged sliding carriages 35.

The two pairs of base plates 30, 31 and 32, 33 lying opposite of one another along the guides 25, 26 are respectively connected by means of spindle gears 36, 37, wherein each spindle gear 36, 37 consists of a threaded spindle 38 with two oppositely oriented thread sections 39, 40 that are respectively engaged with a threaded sleeve 41, 42 in order to thereby realize a motive connection designed for generating a symmetric opening and closing motion referred to a vertical center plane between the mold holders 27, 28. The threaded sleeves 41, 42 are mounted on the underside of the base plates 30, 31 and 32, 33 with respect to the transmission of axial forces in the sense of an opening and a closing motion of the mold holders 27, 28.

The opposing ends of the spindle gears 36, 37 respectively are motively connected to a servomotor 45, 46 via a gear mechanism 43, 44, wherein the mounting of these servomotors is described in greater detail below. Both servomotors 45, 46 are respectively coupled to the sides of the gear mechanisms 43, 44, which respectively lie opposite of the aforementioned ends of the spindle gears 36, 37, and extend parallel to the spindle gears 36, 37 underneath the plane defined by the two guides.

In this case, the closing motion of the mold holders 27, 28, as well as their clamping, is realized with the two servomotors 45, 46.

A cooling air system is described below with reference to the drawings illustrated in FIGS. 11-16.

On its side facing away from the mold halves 29, the mold holder 28 is provided with a number of duct elements that corresponds to the number of mold halves, in this case four duct elements 47 that are designed for conveying cooling air and connected to a compressed air source that is not illustrated in FIGS. 11-15. The mold holders 27 lying opposite of the mold holders 28 are realized identically such that the following description can be limited to the mold holders 28.

On its end facing the mold holder 28, each duct element 47 ends in a hollow shaft 48 on the lower end of the mold holder, wherein an additional vertical duct 49 leads from said hollow shaft to a series of cooling ducts 55 within the mold half 29 via a first chamber 53 and an adjacent second chamber 54, and wherein the cooling ducts 55 are in the peripheral direction of the mold half 29 uniformly distributed along a circular line extending concentric to the axis thereof. Consequently, the chamber 54 fulfills a distribution function for the cooling air in order to thereby achieve a cooling effect that uniformly cools the volume of the mold half. The outlet openings of the cooling ducts 55 are located in the upper side of the mold half 29.

The reference symbol 56 identifies a control unit that is active in the chamber 53 and serves for controlling the flow of cooling air being conveyed through this chamber and therefore the cooling air flowing through the cooling ducts 55 in order to cool the mold halves 29. A not-shown drive is assigned to this control unit. For example, an individual adjustment of any or all quarter segments of the mold halves 29 can be realized by means of these control units 56.

The reference symbols 50, 51 identify additional chambers that follow one another in this sequence and end in an outlet element 52, from which a flow of cooling air is discharged in order to cool a neck shape of the hollow glass article being produced.

The reference symbol 57 identifies an additional hollow shaft, by means of which the end of the duct element 47 lying opposite of the receptacle 48 is continuously connected to a duct 58, along which a shut-off valve 60 is arranged adjacent to a control valve 59.

Figure 14:
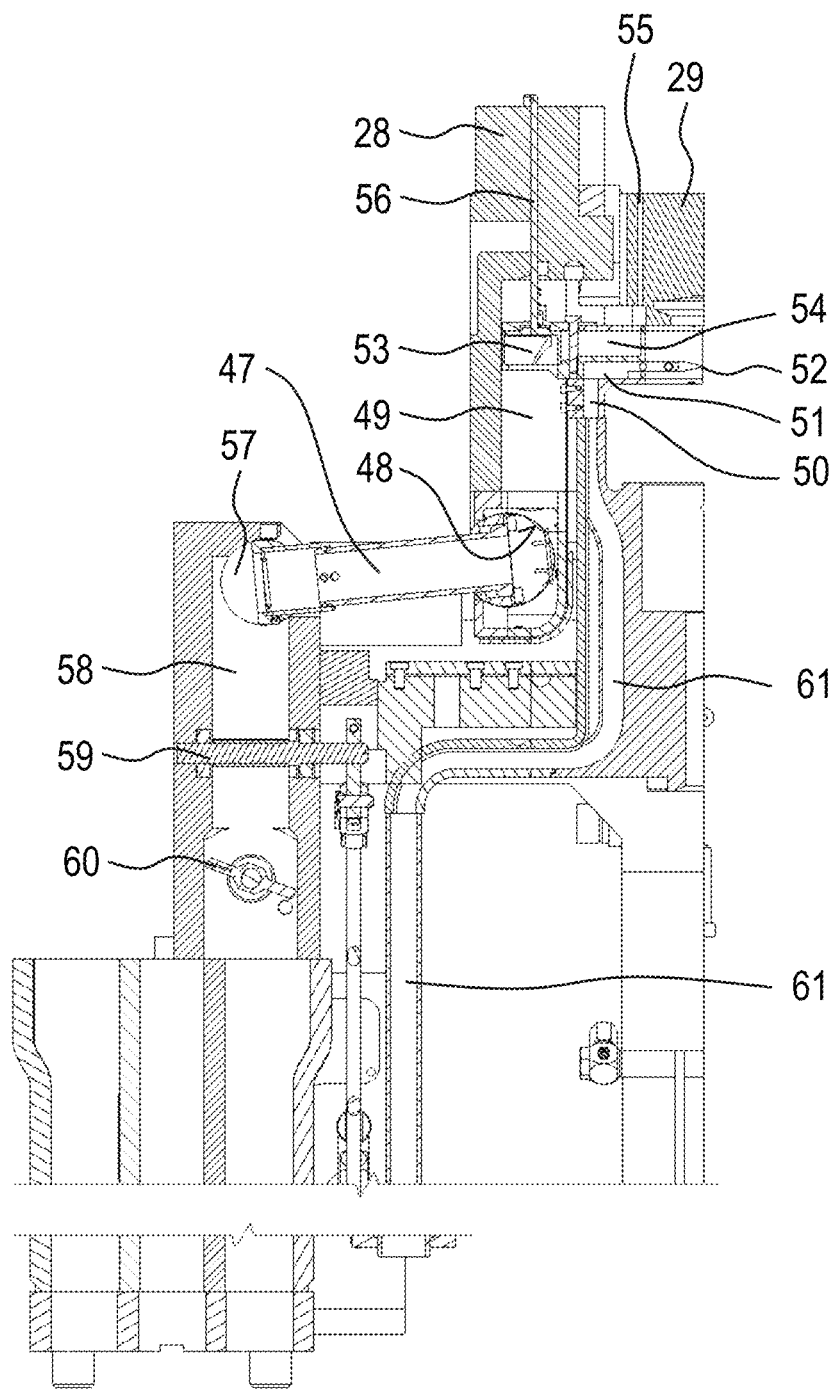
FIG. 14 shows a partially sectioned representation of a cooling air system in the mold holder.
Figure 15:
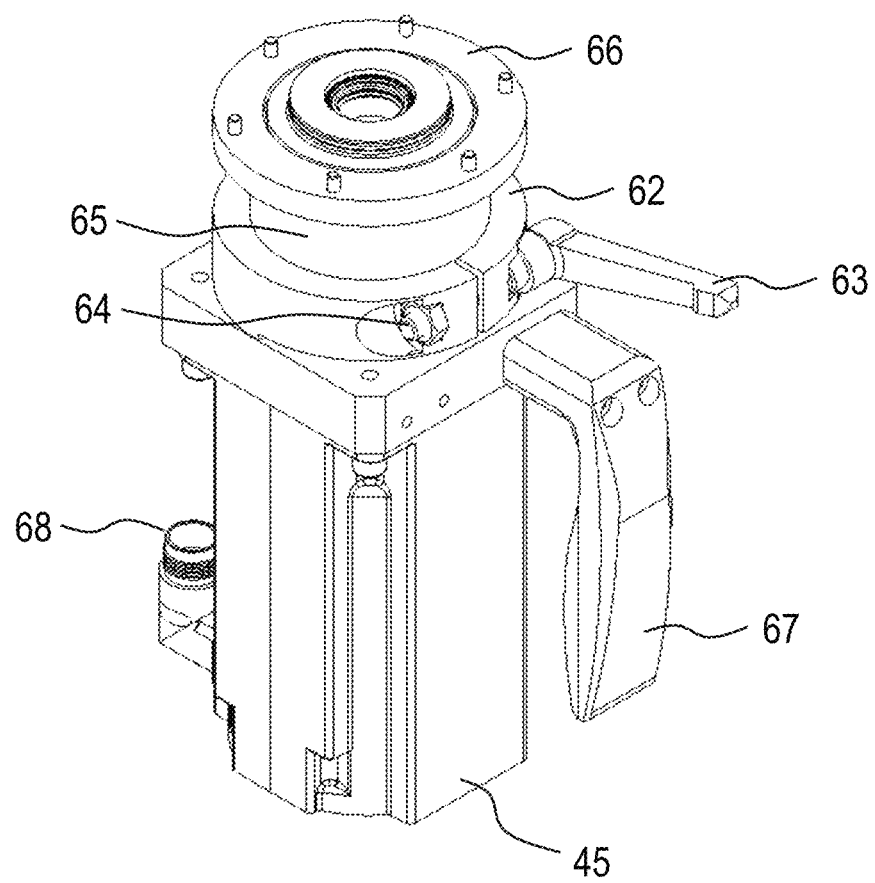
FIG. 15 shows a perspective representation of the mounting of the drive of the closing mechanism according to FIG. 5.
Figure 16:
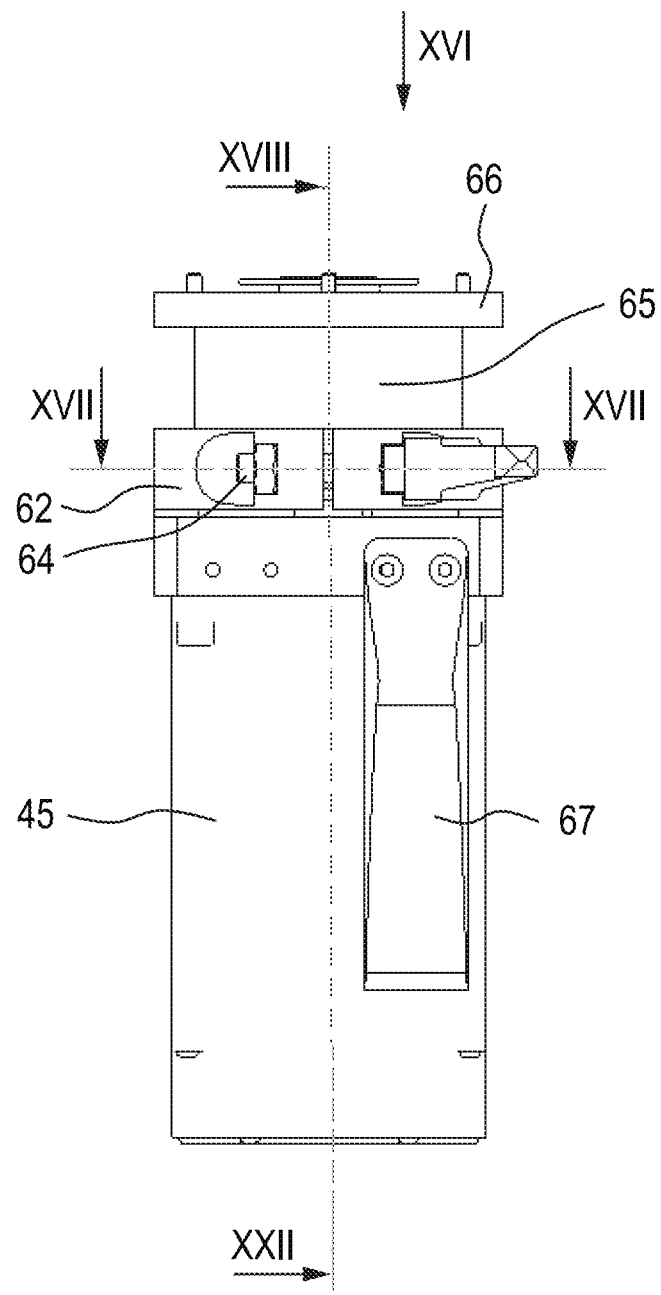
FIG. 16 shows a planar view of the drive according to FIG. 15 in the viewing direction XVI in FIG. 15.
Figure 17:
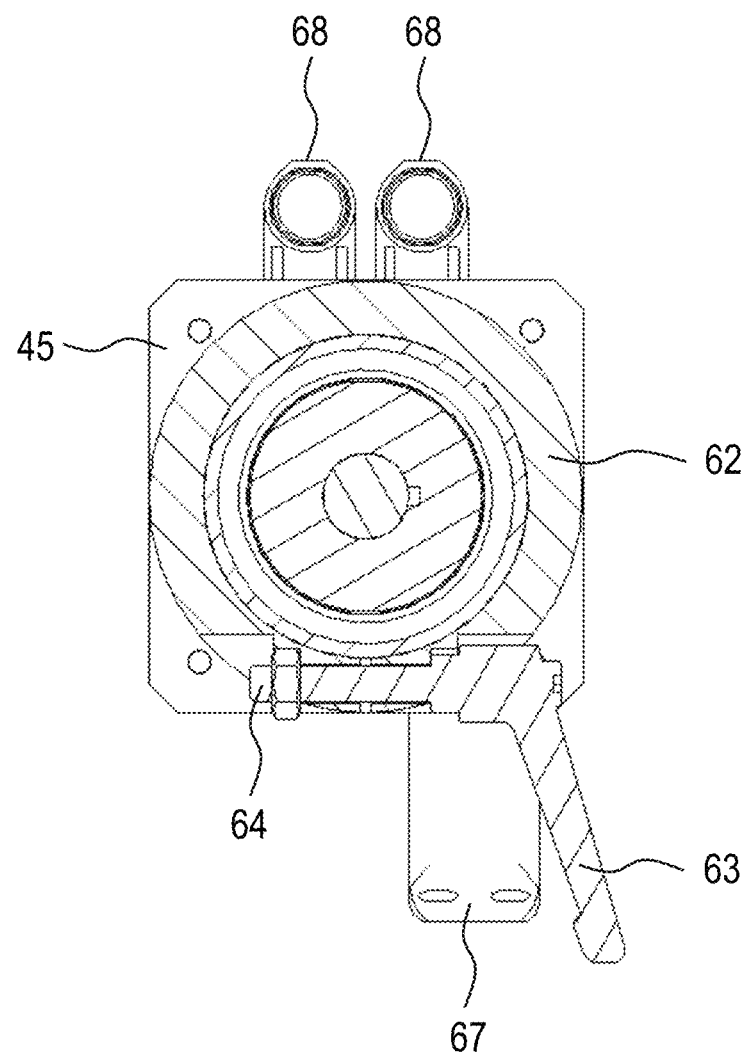
FIG. 17 shows a planar view of the drive in the viewing direction XVII in FIG. 16.
Figure 18:
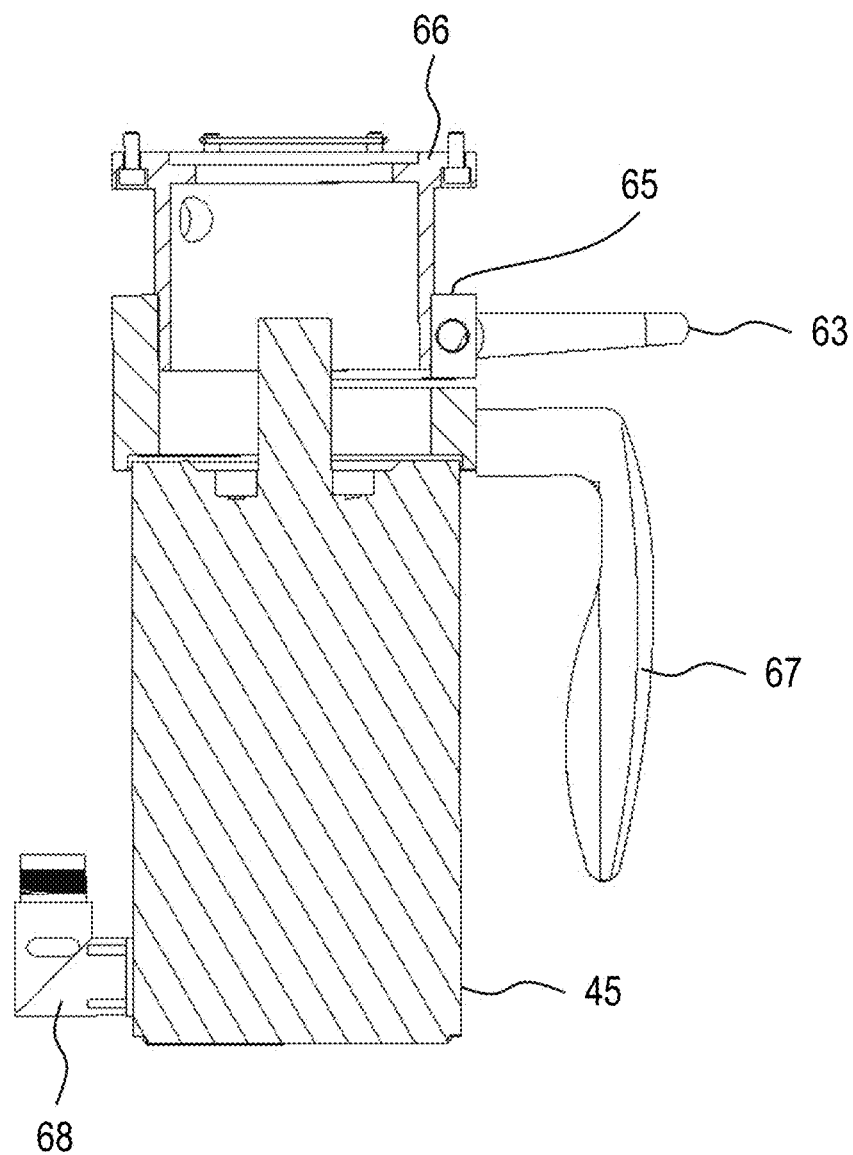
FIG. 18 shows a view of the drive in the plane of section XVIII-XVIII in FIG. 16.

The reference symbol 61 identifies a duct that is continuously connected to the chambers 50, 51 on its upper end in FIG. 14 and therefore serves for conveying a flow of cooling air for cooling the neck shape.

The ends of the ducts 58, 61 lying opposite of the receptacle 57 and the chamber 50 are connected to a compressed air or cooling air source, wherein this connection is not illustrated in the drawings.

The connection of a servomotor 45, 46 to an intermediate gear mechanism 43, 44 is described below with reference to FIGS. 15-18.

This connection is constructively designed for respectively achieving a simple and fast installation or removal of the subassembly "servomotor" and is characterized by a clamping connection, in which an annular clamping body 62 with an axial gap can be tensioned and released by means of a clamping lever 63. For this purpose, the clamping lever 63 is functionally connected to a clamping screw 64 that peripherally extends toward the annular clamping body 62, wherein a frictional connection between a cylindrical housing body 65, which is connected to the housing of the assigned gear mechanism 43 by means of a flange 66, and the housing of the servomotor 45, which is connected to the annular clamping body 62, is produced in the clamped state. A handle 67 arranged on the housing of the servomotor 45 ensures comfortable handling during an installation or removal process.

Such an installation of a servomotor is equally suitable for use in both variations.

The reference symbol 68 identifies the electric terminal of the servomotor 45.

The connection between an output shaft of the servomotor 45 and a facing output shaft of the gear mechanism 43 may be realized, for example, in the form of a plug-type connection.

Figure 6:
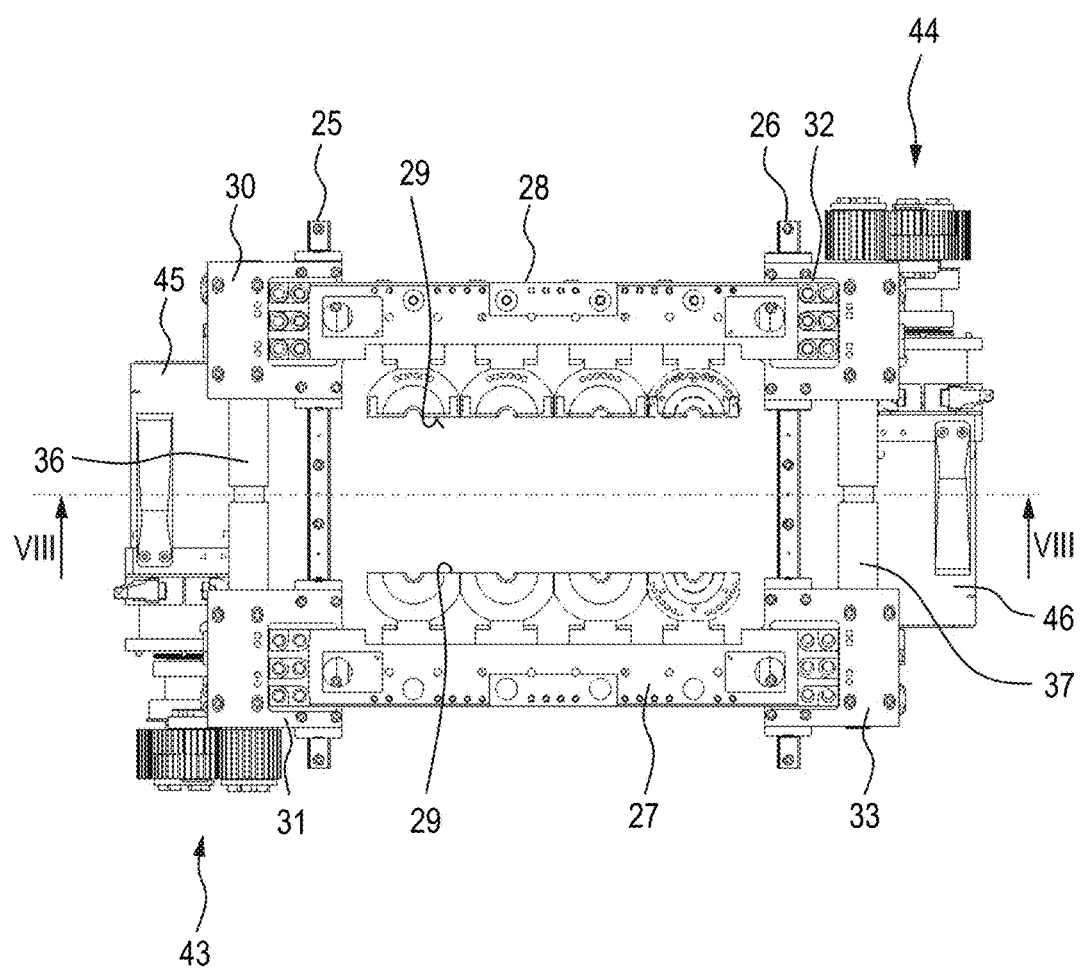
FIG. 6 shows a top view of the closing mechanism according to FIG. 5 in the form of a planar representation.
Figure 7:
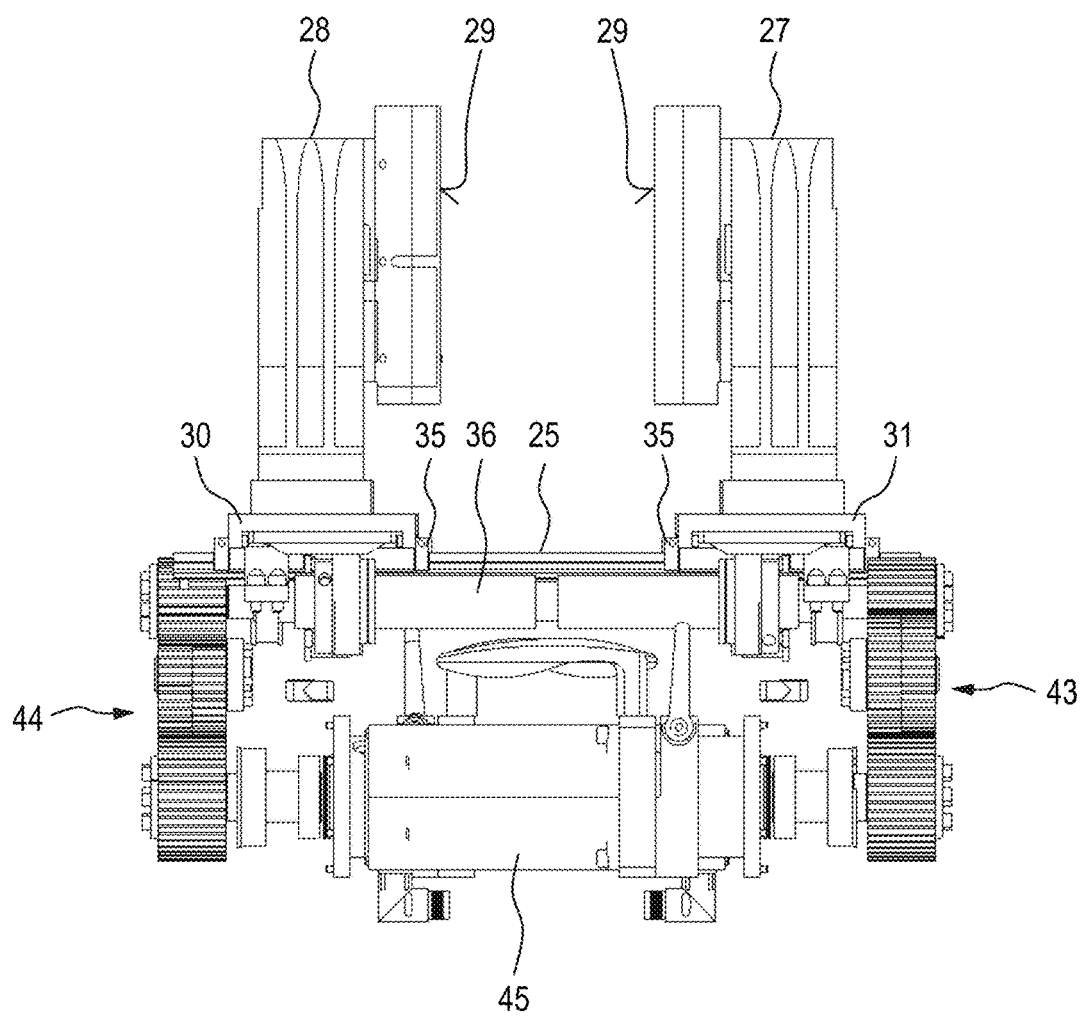
FIG. 7 shows a partially planar representation of the closing mechanism in the viewing direction VII in FIG. 5.
Figure 8:
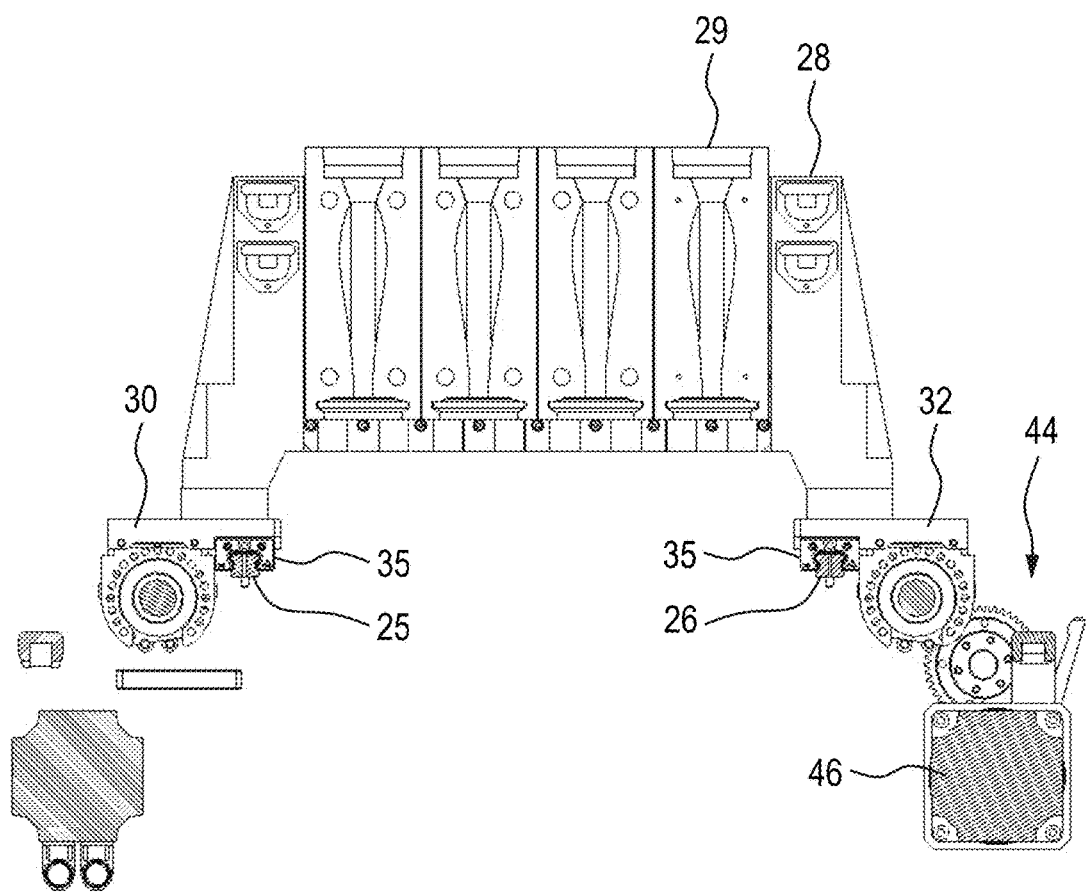
FIG. 8 shows a representation of the closing mechanism according to FIG. 5 in the vertical plane of section VIII-VIII in FIG. 5.
Figure 9:
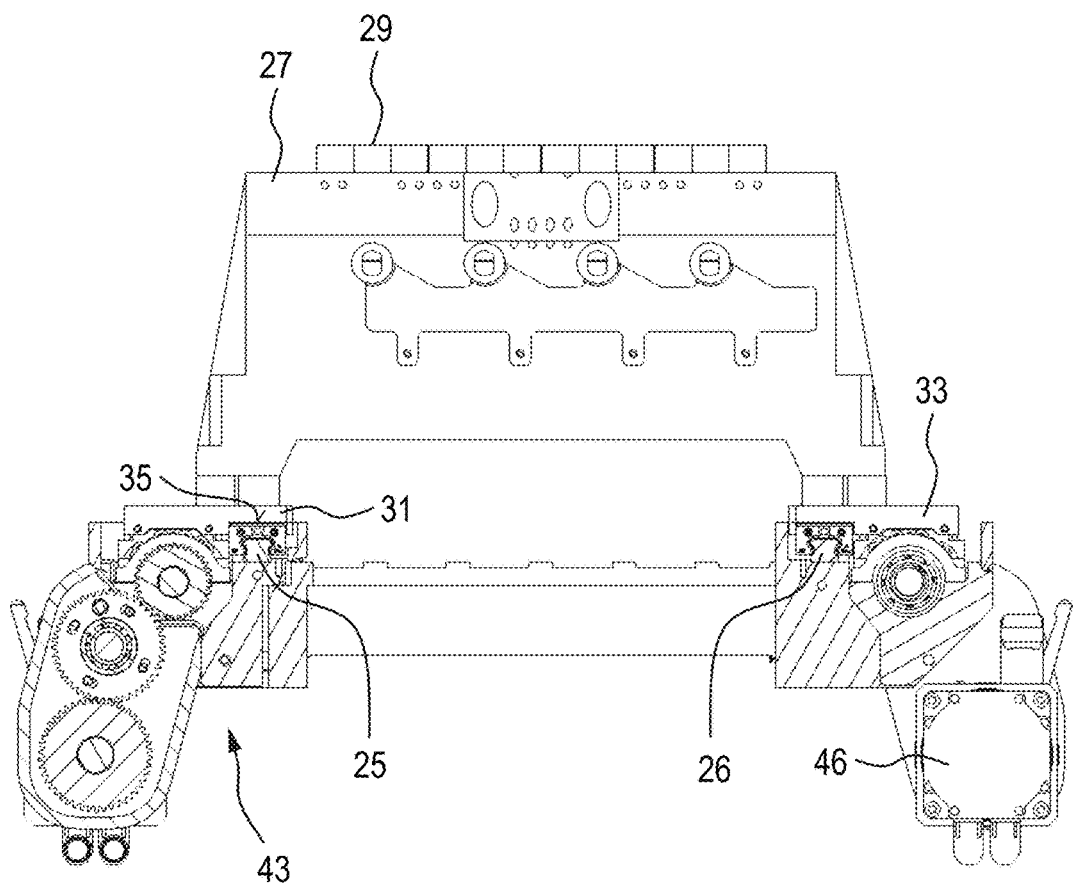
FIG. 9 shows a view of the closing mechanism according to FIG. 5 in the plane IX-IX in FIG. 5.
Figure 10:
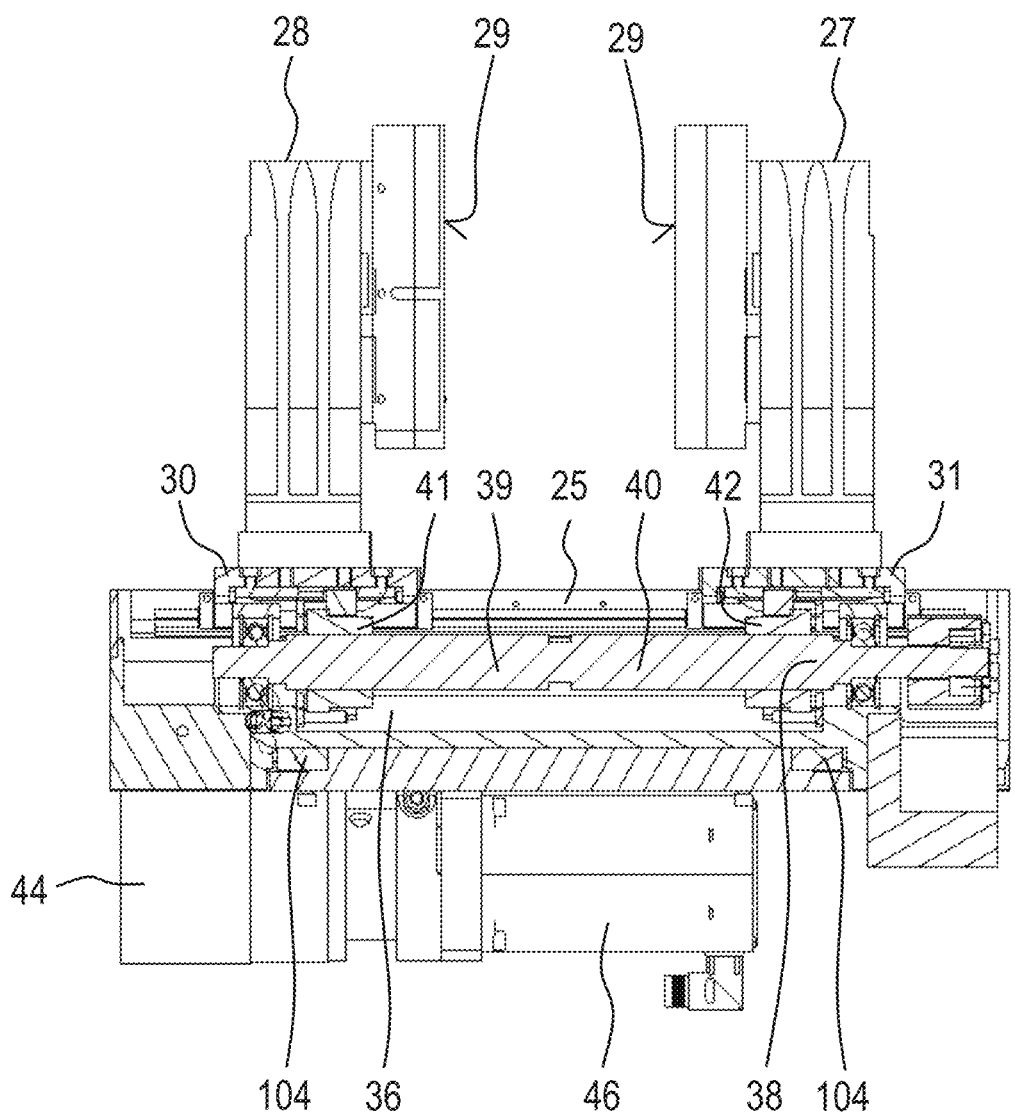
FIG. 10 shows a planar view of the closing mechanism that is partially sectioned along the plane X-X in FIG. 5.
Figure 11:
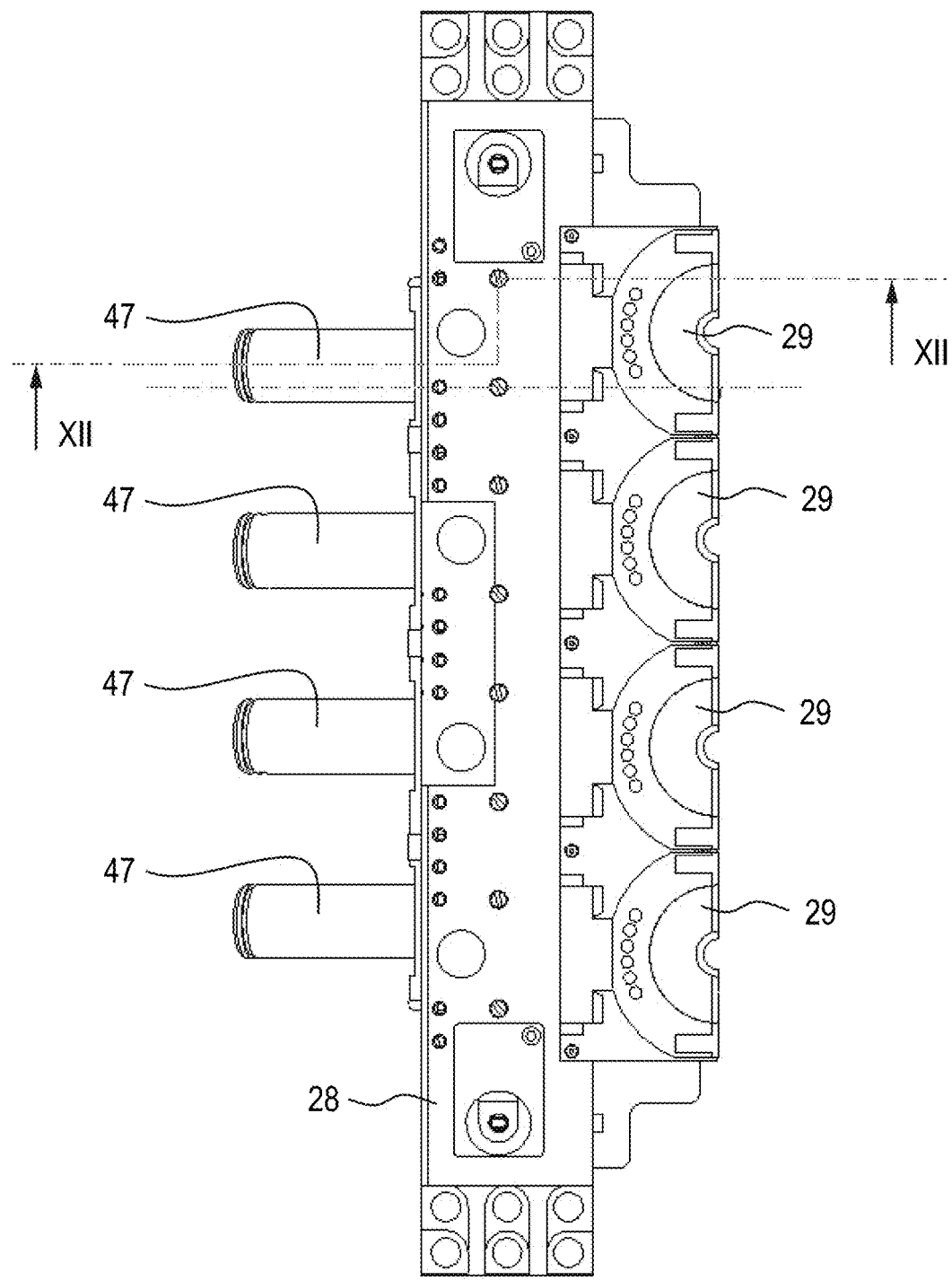
FIG. 11 shows a top view of the closing mechanism in the form of a partially planar representation in the viewing direction XI in FIG. 5.
Figure 12:
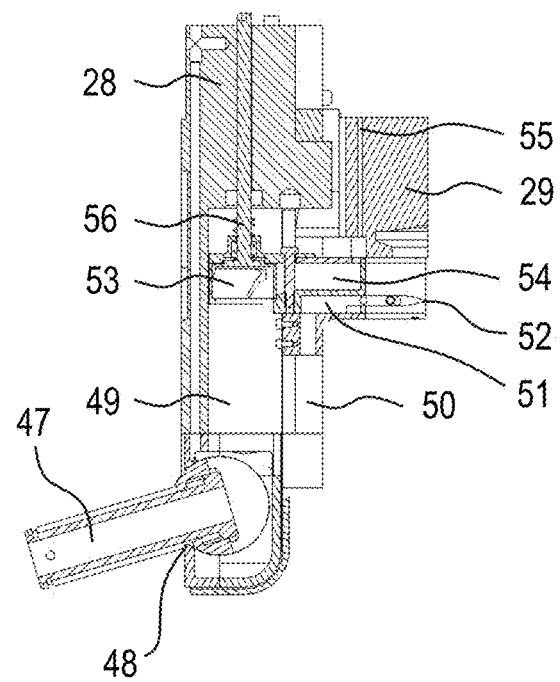
FIG. 12 shows a partial view of the closing mechanism in the vertical plane of section XII-XII in FIG. 11.
Figure 13:
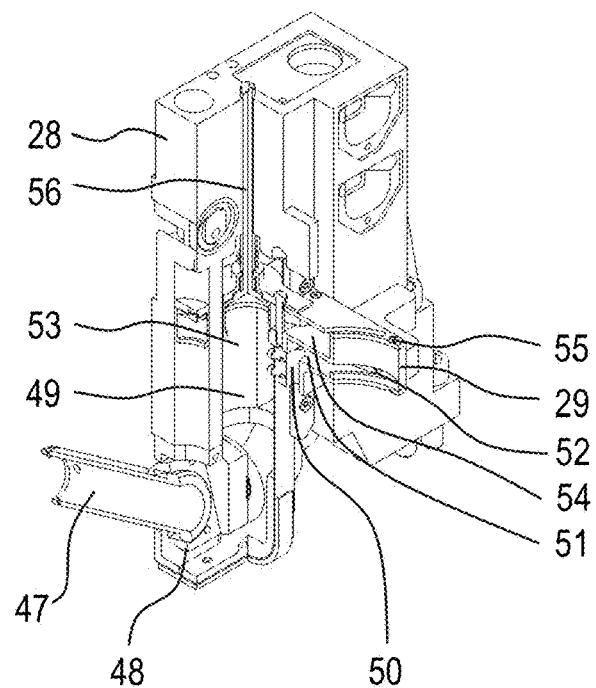
FIG. 13 shows a partially sectioned perspective view of FIG. 12.
Figure 19:
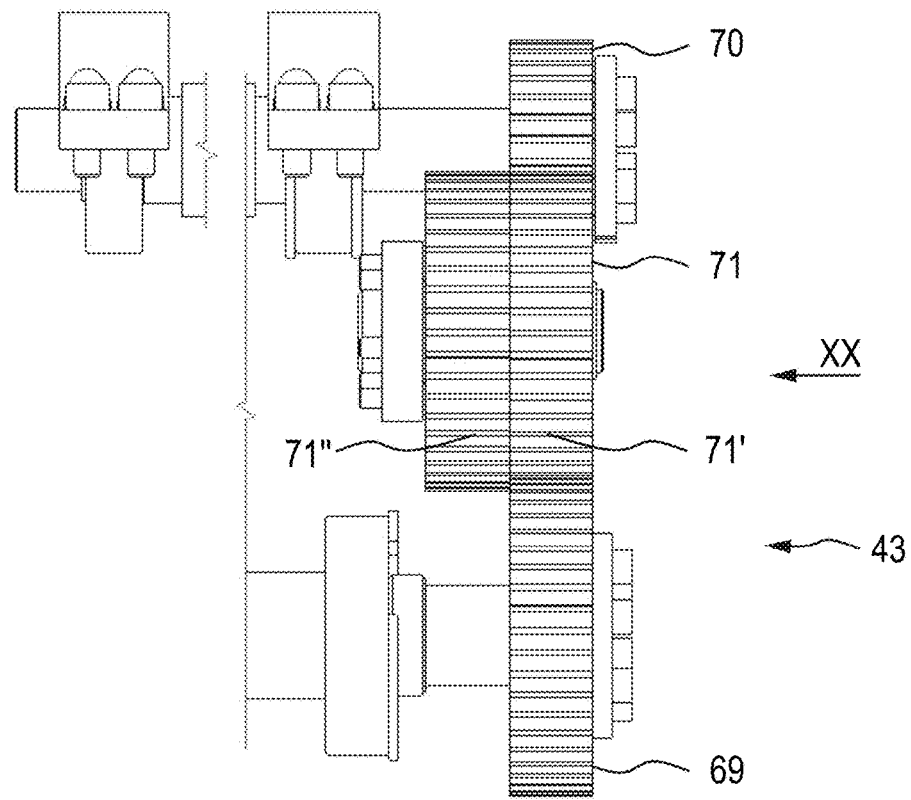
FIG. 19 shows an enlarged partial representation of the gear mechanism assigned to the drive according to FIG. 15.
Figure 20:
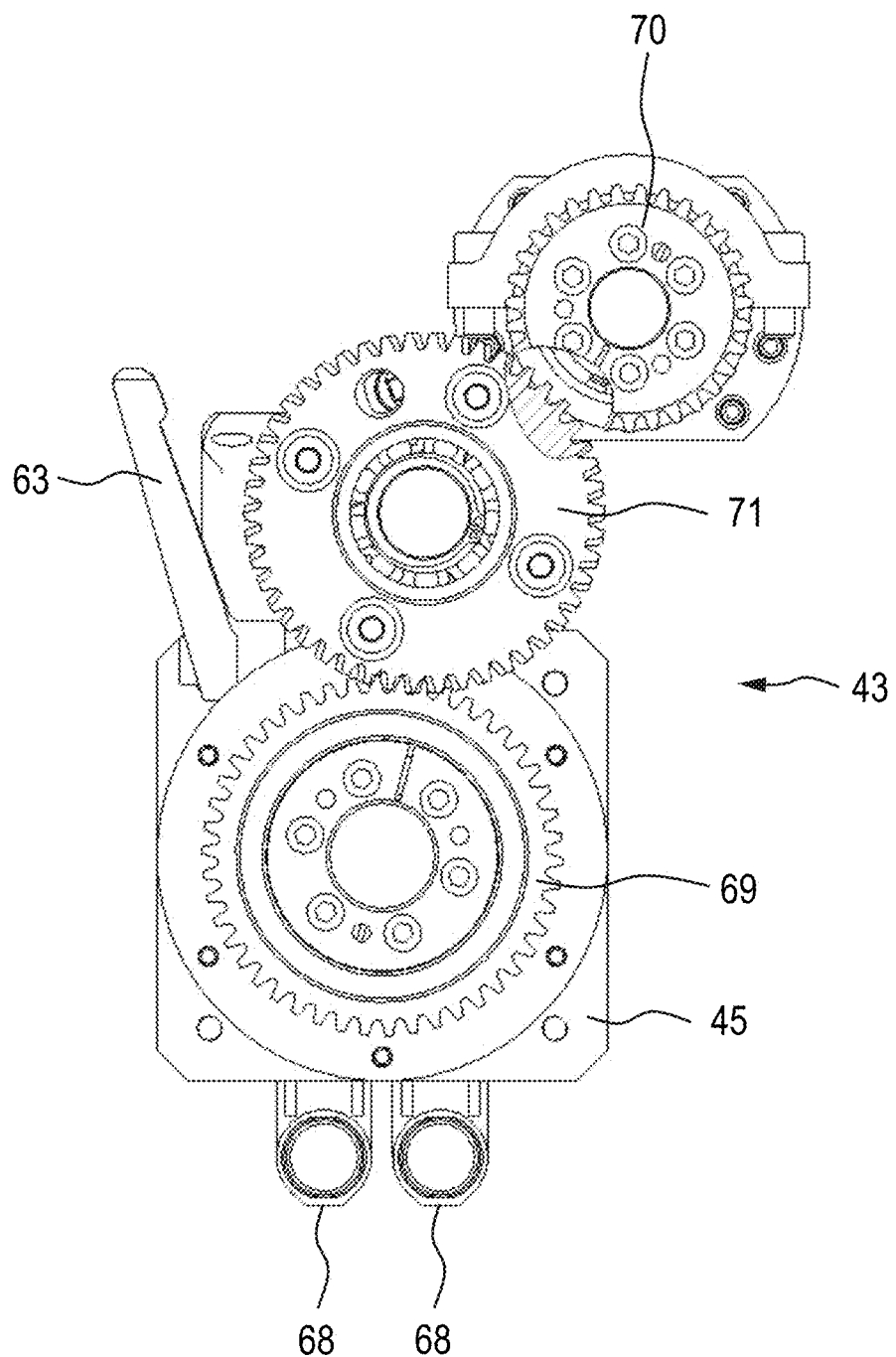
FIG. 20 shows a view of the gear mechanism in the viewing direction XX in FIG. 19.

A gear mechanism 43, 44 according to FIG. 6 is described below with reference to FIGS. 19 and 20. Both gear mechanisms 43, 44 are realized identically such that the description can be limited to one gear mechanism.

The gear mechanism 43 consists of a first gear wheel 69 that is motively connected to the output shaft of the servomotor 45 (FIG. 6), a second gear wheel 70 that is coupled to the spindle gear 36 (FIG. 6) and a third gear wheel 71 arranged between these two gear wheels 69, 70. According to FIG. 19, the intermediately arranged gear wheel 71 consists of two coaxial gear disks 71', 71", which are rotatable relative to one another, such that a backlash-free motive connection between the servomotor 45 and the spindle gear 36 can be realized with a corresponding relative rotation.

Figure 21:
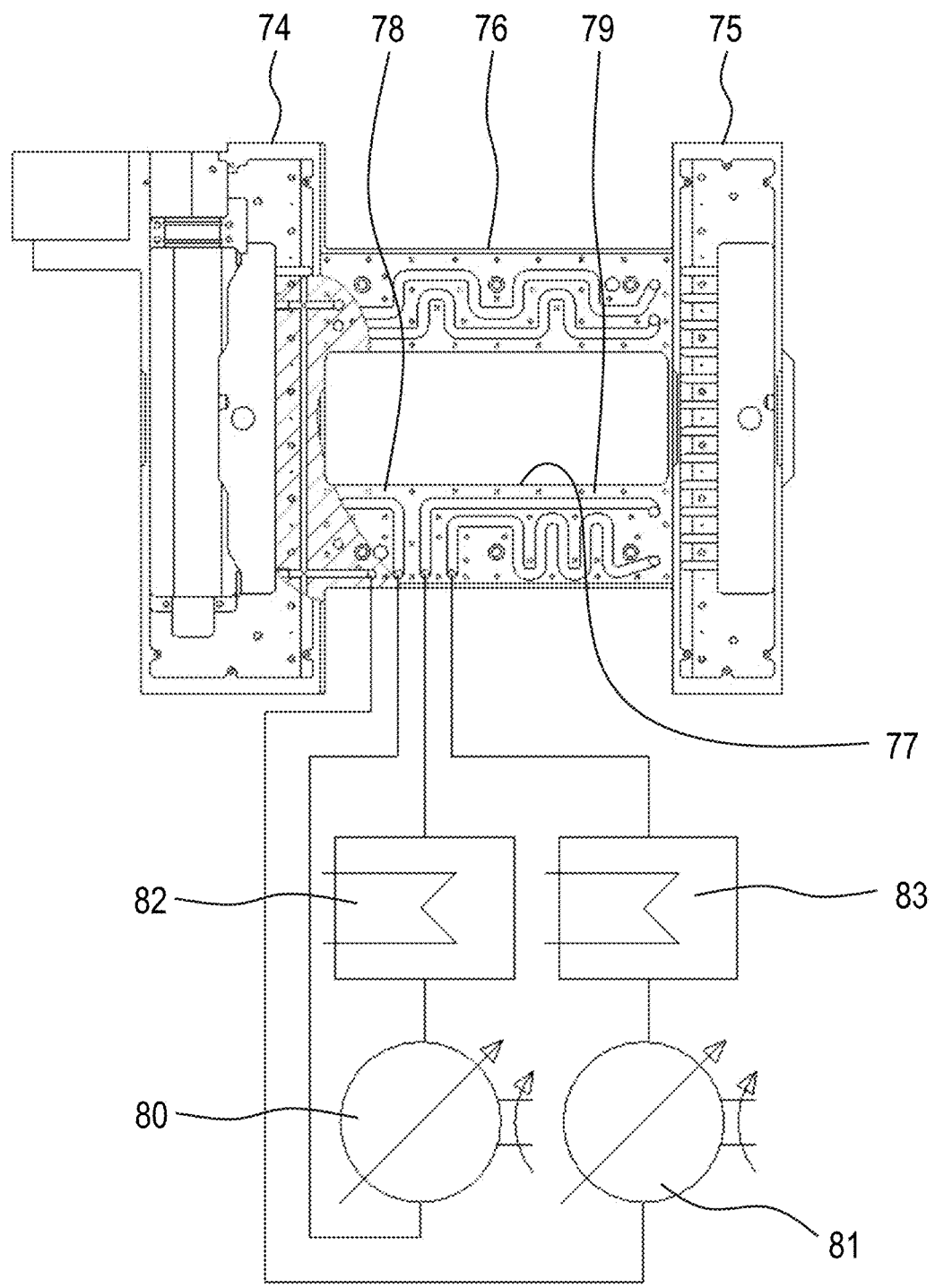
FIG. 21 shows a schematic representation of the cooling water distribution within the machine base body.
Figure 22:
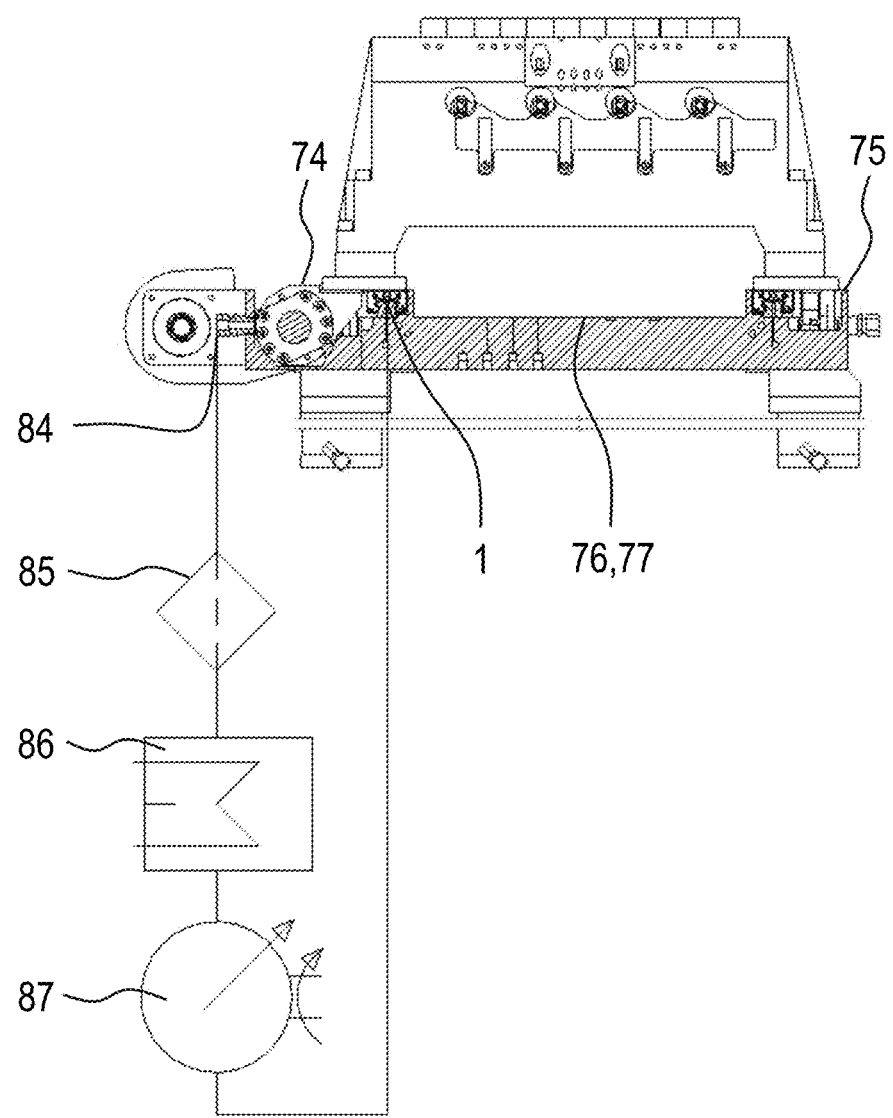
FIG. 22 shows a schematic representation of the lubricant circuit of the closing mechanism.

A cooling water circuit is described below with reference to FIG. 21. This figure shows two elongate housings 74, 75 that extend parallel to one another and are respectively designed for accommodating the two toggle lever mechanisms 17, as well as the spindle gear 13, wherein said housings are in the vicinity of their end regions connected to one another by means of two transverse structures 76, 77 extending parallel to one another. Two networks 78, 79 of ducts designed for conveying cooling water extend within the two transverse structures 76, 77, namely such that they uniformly penetrate their respective volume or mass, wherein complete circuits are jointly formed by these two duct networks and respective pumps 80, 81 and coolers 82, 83 arranged outside the transverse structures.

Temperature-related stress between the mold holders and the machine base body can thereby be prevented with a cooling air system according to FIGS. 11-14 that cools the molds, as well as the mold holders.

The guide 1 forms part of a lubricant circuit that includes the housing 74, wherein the lubricant is supplied via the guide 1, wherein the spindle gear 13, as well as the gear mechanism 15, is flooded with overflowing lubricant within the housing 74, and wherein an overflow 84 is provided, the position of which limits the lubricant level within the housing 74. The overflowing lubricant is conveyed back to the guide 1 via a filter 85, a cooler 86 and a pump 87 such that a closed circuit is formed.

The comparable lubricant circuit is provided for the guide 2.

Such a lubrication concept is equally suitable for use in the first and second variations of an inventive closing mechanism. Such a recirculation system eliminates an otherwise required loss lubrication and therefore contributes to an economical operation of a thusly equipped glass forming machine.

The lubricating and cooling concepts are likewise suitable for use in both variations.

Figure 23:
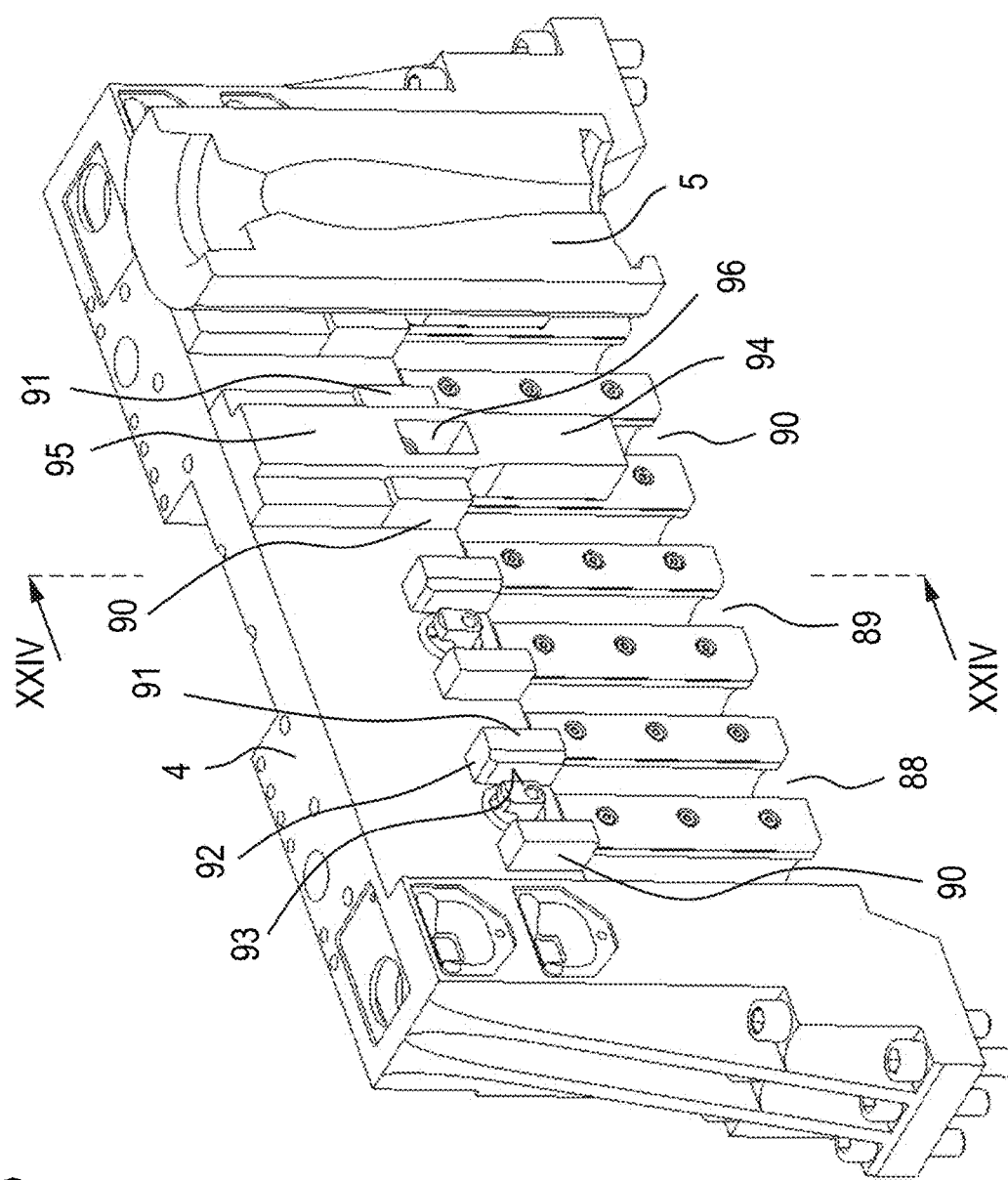
FIG. 23 shows a perspective partial representation of a mold holder of the closing mechanism.
Figure 24:
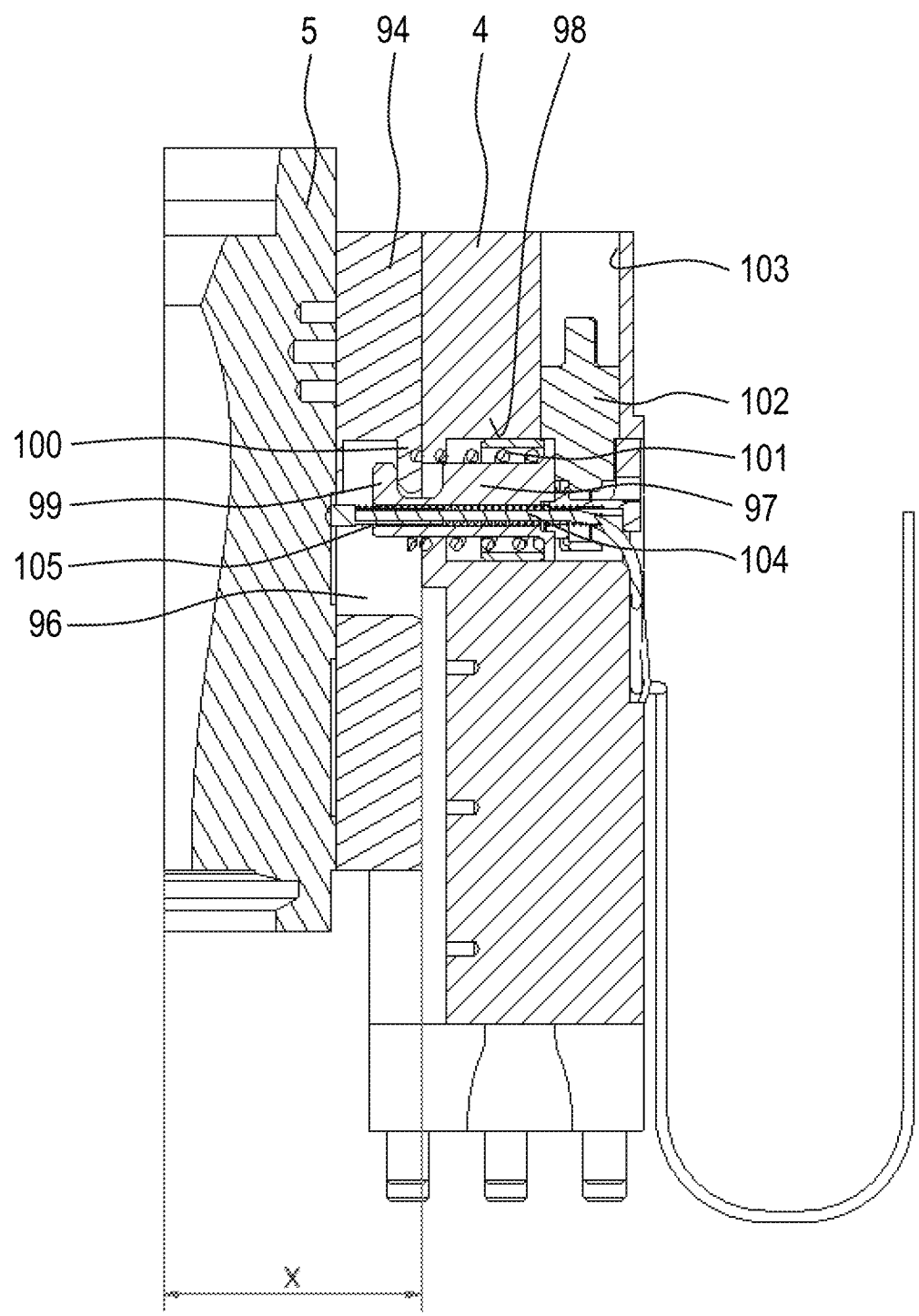
FIG. 24 shows a partial representation of the mold holder in the plane of section XXIV-XXIV in FIG. 23.

FIGS. 23 and 24 show the concept of centering and mounting a mold half 5 on a mold holder 4, wherein the mounting on the mold holder 3 is realized identically such that the description can be limited to one mold holder 4.

The reference symbols 88, 89, 90 identify three grooves, which vertically extend parallel to one another on the side of the mold holder 4 that faces the other, not-shown mold holder and on the upper end region of which cuboid contact elements 90, 91 are located both sides of the respective groove. These contact elements 90, 91 respectively form upper contact edges and lateral guide surfaces 93 for a sliding block 94 that in its upper section forms a T-profile, the base side of which adjoins the mold holder 4 that rests on the contact edges of the contact elements 91, 92 on both sides and is centered by the lateral guide surfaces 93. The base plane of the mold holder 4 forms the contact surface for the sliding block 94.

On its side facing away from the mold holder 4, the sliding block 94 forms a continuous, vertically extending web 95 that features a recess 96 in an approximately central region adjacent to the two contact elements 90, 91, wherein a tensioner 97, which is horizontally guided in a recess 98 of the mold holder 4 and features a hook 99 on its end facing the sliding block 94, protrudes into the aforementioned recess of the vertically extending web, and wherein said hook is designed for engaging behind a web 100 that defines the recess 96 on its side facing away from the mold half 5.

The sliding block 94 is connected to the mold half 5 by means of a not-shown connection such that both components can be unitarily handled as a subassembly during an exchange of a mold half.

The engagement of the hook 99 on the web 100 is prestressed by means of a spring 101, the tension of which can be adjusted with the aid of a cam 102 mounted in a bore 103 of the mold holder 4. The tensioner 97 can always be displaced between an installation position of the mold half, in which the hook 99 engages behind the web 100 in a tensioned fashion, and a removal position, in which the hook 99 can be respectively engaged with or disengaged from the web, by means of the cam 102 in connection with the spring 101.

The spring-loaded tensioner 97 and the sliding block 94 jointly form a quickly and easily actuatable clamping system. In the installation position, the mold half is always fixed on all sides.

The reference symbol 104 identifies a temperature sensor that is guided in a bore 105 of the tensioner 97 and contacts the mold half 5 with its free end in order to thereby measure the temperature thereof.

The dimensions of the recess 96, as well as the positions of the hook and of the web 100, are chosen such that the mold half 5 connected to the sliding block 94 can be fixed in its working position by inserting the hook 99 into the recess 96, namely by means of the cam 102. The mold half 5 is centered in the thusly achieved installation position shown.

LIST OF REFERENCE SYMBOLS

1 Guide
2 Guide
3 Mold holder
4 Mold holder
5 Mold half
6 Base plate
7 Base plate
8 Base plate
9 Base plate
10 Sliding carriage
11 Mounting plate
12 Mounting plate
13 Spindle gear
14 Axis
15 Gear mechanism
16 Location
17 Toggle lever mechanism
18 Toggle lever
19 Toggle lever
20 Connecting lever
21 Piston rod
22 Piston-cylinder unit
23 Drive unit
24 Drive unit
25 Guide
26 Guide
27 Mold holder
28 Mold holder
29 Mold half
30 Base plate
31 Base plate
32 Base plate
33 Base plate 34 Base plate
35 Sliding carriage
36 Spindle gear
37 Spindle gear
38 Threaded spindle
39 Thread section
40 Thread section
41 Threaded sleeve
42 Threaded sleeve
43 Gear mechanism
44 Gear mechanism
45 Servomotor
46 Servomotor
47 Duct element
48 Shaft
49 Duct
50 Chamber
51 Chamber
52 Outlet element
53 Chamber
54 Chamber
55 Cooling duct
56 Control unit
57 Shaft
58 Duct
59 Control valve
60 Shut-off valve
61 Duct
62 Annular clamping body
63 Clamping lever
64 Clamping screw
65 Housing body
66 Flange
67 Handle
68 Terminal
69 Gear wheel
70 Gear wheel
71 Gear wheel
72 Gear disk
73 Gear disk
74 Housing
75 Housing
76 Transverse structure
77 Transverse structure
78 Network
79 Network
80 Pump
81 Pump
82 Cooler
83 Cooler
84 Overflow
85 Filter
86 Cooler
87 Pump
88 Groove
89 Groove
90 Groove
91 Contact element
92 Contact element
93 Guide surface
94 Sliding block
95 Web
96 Recess
97 Tensioner
98 Recess
99 Hook
100 Web
101 Spring
102 Cam
103 Bore

The invention claimed is:

1. A closing mechanism for molds of an individual section (IS) machine having two mold holders that can be displaced between an open and a closed position and are respectively designed for carrying at least one mold half, the mechanism comprising:
at least one drive configured to displace the two mold holders between the open and closed positions, wherein each mold holder includes an integrated duct network configured to convey a coolant, the mold holders being supported on linear guides extending parallel to one another on both sides of the mold holders and displaceable between the open and closed positions;
at least one spindle gear by which the two mold holders are coupled to one another and which is configured for generating a linear motion, wherein the at least one drive is coupled to the at least one spindle gear, the at least one spindle gear comprising a threaded spindle coupled to the at least one drive and having two oppositely oriented thread sections that are respectively engaged with a threaded sleeve coupled to a respective mold holder;
a pair of housings configured as part of a machine base body of the IS machine and configured for at least accommodating the at least one spindle gear, the pair of housings being coupled to one another in a direction extending perpendicular to the linear guides by a pair of transverse structures; and
at least one duct network configured to convey a coolant and which is arranged within the pair of transverse structures.

2. The closing mechanism according to claim 1, wherein the at least one drive of the mold holders comprises an electric servomotor configured for generating an opening and closing motion, and wherein at least one pneumatically actuated piston-cylinder unit is provided for clamping together the mold holders in the closed position.

3. The closing mechanism according to claim 1, wherein an electric servomotor configured for generating an opening and closing motion of the mold holders is arranged on one side of the mold holders adjacent to one of the two guides, and wherein a pneumatically actuated piston-cylinder unit configured for clamping together the mold holders in the closed position is respectively arranged on both sides of the mold holders.

4. The closing mechanism according to claim 2, wherein the at least one piston-cylinder unit is coupled to the mold holders to clamp together the mold holders by way of a toggle lever mechanism.

5. The closing mechanism according to claim 1, wherein the at least one drive of the mold holders comprises an electric servomotor that is arranged laterally of the mold holders adjacent to a respective linear guide, and wherein the electric servomotors are configured to simultaneously clamp together the mold holders in a closed position.

6. The closing mechanism according to claim 5, wherein guides between the mold holders and the machine base body are configured to allow a stress-free, operationally-related thermal expansion of the mold holders.

7. The closing mechanism according to claim 1, wherein an intermediate gear mechanism is provided for torque transmission from the at least one drive to the spindle gear, wherein the intermediate gear mechanism is configured as a cylindrical gear unit, and wherein at least one gear wheel of the cylindrical gear unit comprises two gear discs rotatable relative to one another and fixable in a relative rotational position.

8. The closing mechanism according to claim 1, wherein the at least one duct network for conveying a coolant is configured for cooling at least one mold half.

9. The closing mechanism according to claim 1, wherein a cooling system formed by the at least one duct network is at least partially configured as a permanent cooling system.

10. The closing mechanism according to claim 1, wherein a flow of the coolant can be individually adjusted for at least one quarter segment of the mold halves.

11. The closing mechanism according to claim 1, wherein the at least one duct network for conveying the coolant is configured for cooling at least one neck shape.

12. The closing mechanism according to claim 1, wherein the at least one duct network for conveying the coolant is incorporated into a circuit that comprises at least a cooler and a pump.

13. The closing mechanism according to claim 1, wherein two circuits are provided and respectively comprise duct networks for conveying the coolant, and wherein said circuits are respectively configured for at least cooling part of the transverse structures.

14. The closing mechanism according to claim 1, wherein a lubricant supply in the form of a recirculating lubrication system is provided and configured in the form of a circuit that includes at least a cooler and a pump.

15. The closing mechanism according to claim 14, wherein the linear guides are provided with outlet openings for a lubricant on an upper side of the linear guides.

16. The closing mechanism according to claim 1, wherein the housings are configured to accommodate the spindle gears and the toggle lever mechanisms.

17. The closing mechanism according to claim 1, wherein the housings are configured to accommodate at least one intermediate gear mechanism.

18. The closing mechanism according to claim 1, wherein the housings form part of a lubricant supply and are configured to provide a lubricant bath and an overflow for the lubricant.

19. The closing mechanism according to claim 1, wherein the housings are closed with cover segments that are slidably arranged on graphite seals and an interior of the housings can be acted upon with sealing air.

20. The closing mechanism according to claim 7, wherein a clamping connection between an electric servomotor and a gear mechanism can be actuated without a tool.

21. The closing mechanism according to claim 1, wherein an arrangement of vertical and horizontal guides is provided on each mold holder and for each mold half such that an installation position for a mold half is respectively defined, and wherein at least one counter element configured for cooperating with the arrangement of vertical and horizontal guides is provided on each mold half.

22. The closing mechanism according to claim 21, wherein the arrangement comprises contact elements that respectively form a lateral guide surface and a horizontal contact surface, and wherein the counter element is configured as a sliding block arranged on a facing side of the mold half.

23. The closing mechanism according to claim 22, wherein shaped elements are integrally formed on the sliding block and are configured to be respectively supported on two contact elements.

24. The closing mechanism according to claim 22, wherein a tensioning device is provided between the mold holder and the mold half in order to generate tension between the mold half and the mold holder.

25. The closing mechanism according to claim 24, wherein the tensioning device comprises a displaceably arranged hook configured to engage behind a web of the sliding block.

26. The closing mechanism according to claim 2, wherein the electric servomotor configured for generating the opening and closing motion of the mold holders is arranged on one side of the mold holders adjacent to one of the two linear guides, and further wherein a pneumatically-actuated piston-cylinder unit configured for clamping together the mold holders in the closed position is respectively arranged on both sides of the mold holders.

27. The closing mechanism according to claim 3, wherein at least one piston-cylinder unit is coupled to the mold holders to be clamped together by way of a toggle lever mechanism.

28. The closing mechanism according to claim 12, wherein the at least one duct network for conveying the coolant is configured for cooling at least one mold half.

29. The closing mechanism according to claim 9, wherein a flow of the coolant can be individually adjusted for at least one quarter segment of the mold halves.

30. The closing mechanism according to claim 18, wherein a clamping connection between an electric servomotor and a gear mechanism can be actuated without a tool.

31. The closing mechanism according to claim 2, wherein an arrangement of vertical and horizontal guides is provided on each mold holder and for each mold half such that an installation position for a mold half is respectively defined, and wherein at least one counter element configured for cooperating with the arrangement of vertical and horizontal guides is provided on each mold half.

* * * * *